US012684641B2

(12) United States Patent
Jiang et al.

(10) Patent No.: US 12,684,641 B2
(45) Date of Patent: Jul. 14, 2026

(54) METHOD AND SYSTEM FOR RETRIEVING LOST-OF-CONTACT MOBILE TERMINAL, DEVICE, AND STORAGE MEDIUM

(71) Applicant: BOE Technology Group Co., Ltd., Beijing (CN)

(72) Inventors: Qianwen Jiang, Beijing (CN); Yongzhong Zhang, Beijing (CN); Hao Zhang, Beijing (CN); Lili Chen, Beijing (CN); Peng Han, Beijing (CN); Huidong He, Beijing (CN); Juanjuan Shi, Beijing (CN); Weihua Du, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 364 days.

(21) Appl. No.: 18/278,381

(22) PCT Filed: Sep. 20, 2022

(86) PCT No.: PCT/CN2022/120003
§ 371 (c)(1),
(2) Date: Aug. 22, 2023

(87) PCT Pub. No.: WO2023/124277
PCT Pub. Date: Jul. 6, 2023

(65) Prior Publication Data
US 2024/0138010 A1 Apr. 25, 2024
US 2024/0237111 A9 Jul. 11, 2024

(30) Foreign Application Priority Data
Dec. 27, 2021 (CN) .......................... 202111617787.2

(51) Int. Cl.
*H04W 76/18* (2018.01)
*G01S 19/14* (2010.01)

(52) U.S. Cl.
CPC ............. *H04W 76/18* (2018.02); *G01S 19/14* (2013.01)

(58) Field of Classification Search
CPC ........ H04W 76/18; H04W 76/19; G01S 19/14
See application file for complete search history.

(56) References Cited

U.S. PATENT DOCUMENTS 10,943,463 B1    3/2021 Clark
2017/0339005 A1   11/2017 Yuan et al.
(Continued)

FOREIGN PATENT DOCUMENTS

CN    103369062 A    10/2013
CN    104010280 A    8/2014
(Continued)

OTHER PUBLICATIONS

CN202111617787.2 first office action.

*Primary Examiner* — Brian P Cox
(74) *Attorney, Agent, or Firm* — IPro, PLLC

(57) ABSTRACT

Provided is a method for retrieving a lost-of-contact mobile terminal. The method is applied to a first control terminal, and includes: receiving a first lost-of-contact distress signal a first mobile terminal forwarded by a server; displaying a help seeking interface; sending, in response to a help-retrieving instruction, a first help-retrieving request to the server; and receiving a first confirmation help message from a second control terminal from the server, wherein the first confirmation help message indicates that the second control terminal agrees to help retrieve the first mobile terminal.

20 Claims, 15 Drawing Sheets

(56)                References Cited

U.S. PATENT DOCUMENTS

| 2018/0292214 | A1* | 10/2018 | Zhang | ................... | G01C 21/20 |
| 2019/0088025 | A1* | 3/2019 | Tamanaha | ............. | G06F 3/0484 |
| 2019/0297134 | A1* | 9/2019 | Gold | ................ | H04M 1/72415 |
| 2019/0313231 | A1 | 10/2019 | Randolph et al. | | |

FOREIGN PATENT DOCUMENTS

| CN | 104967975 | A | 10/2015 |
| CN | 106658401 | A | 5/2017 |
| CN | 107361418 | A | 11/2017 |
| CN | 109283943 | A | 1/2019 |
| CN | 109729222 | A | 5/2019 |
| CN | 105991325 | B | 6/2019 |
| CN | 111278093 | A | 6/2020 |
| CN | 112566076 | A | 3/2021 |
| CN | 112567435 | A | 3/2021 |
| CN | 212847030 | U | 3/2021 |
| CN | 112666589 | A | 4/2021 |
| CN | 114071424 | A | 2/2022 |
| WO | 2018191986 | A1 | 10/2018 |

* cited by examiner

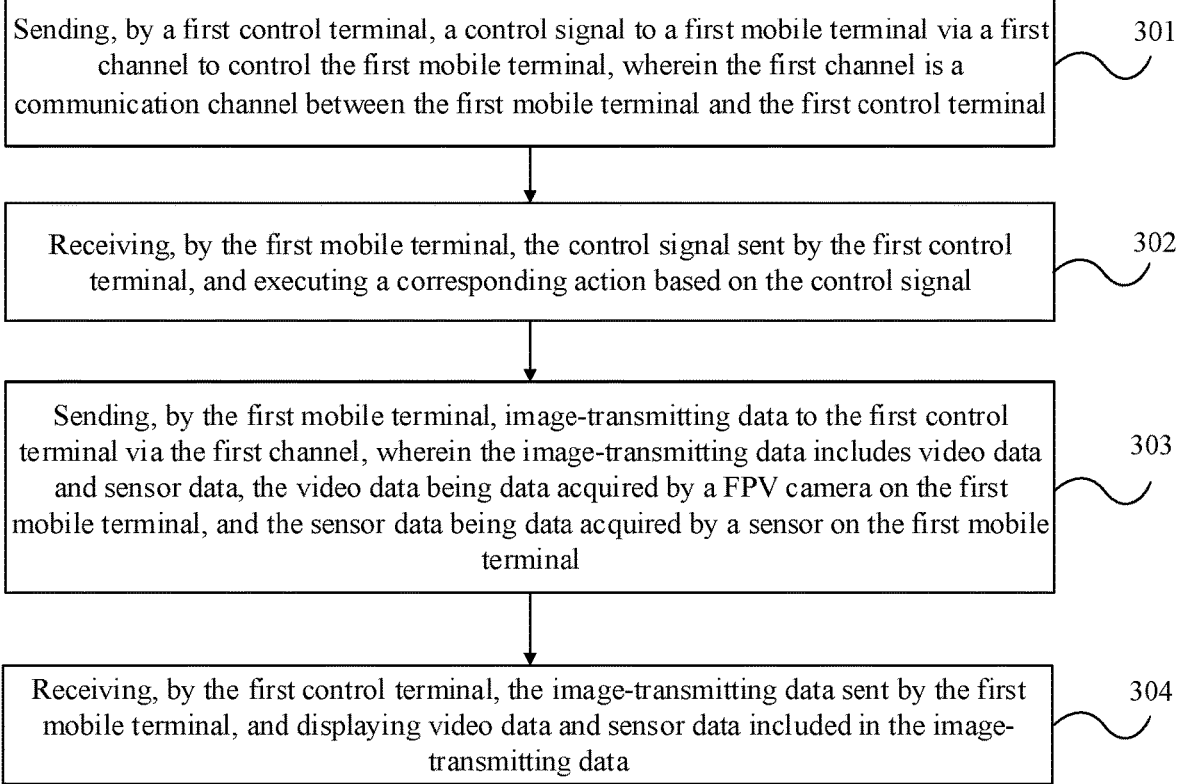

Sending, by a first control terminal, a control signal to a first mobile terminal via a first channel to control the first mobile terminal, wherein the first channel is a communication channel between the first mobile terminal and the first control terminal    301

Receiving, by the first mobile terminal, the control signal sent by the first control terminal, and executing a corresponding action based on the control signal    302

Sending, by the first mobile terminal, image-transmitting data to the first control terminal via the first channel, wherein the image-transmitting data includes video data and sensor data, the video data being data acquired by a FPV camera on the first mobile terminal, and the sensor data being data acquired by a sensor on the first mobile terminal    303

Receiving, by the first control terminal, the image-transmitting data sent by the first mobile terminal, and displaying video data and sensor data included in the image-transmitting data    304

FIG. 3

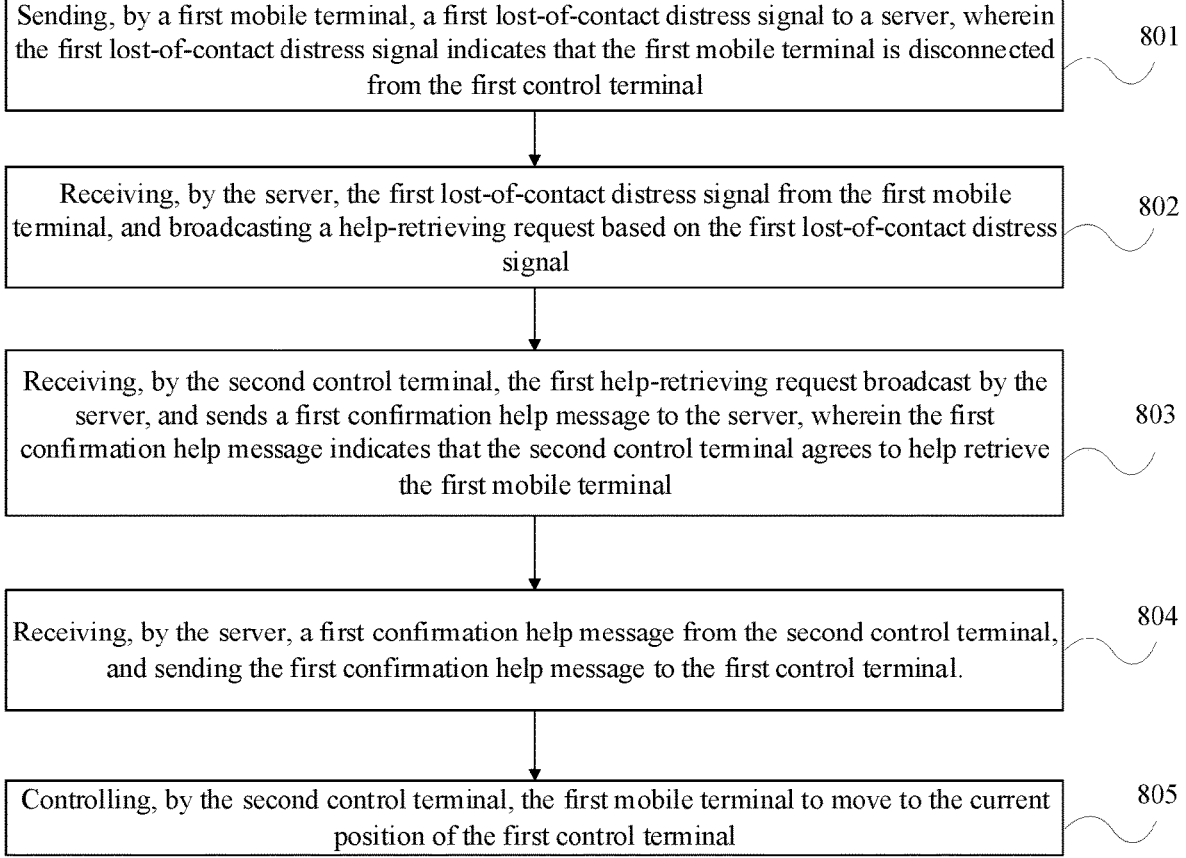

Sending, by a first mobile terminal, a first lost-of-contact distress signal to a server, wherein the first lost-of-contact distress signal indicates that the first mobile terminal is disconnected from the first control terminal    801

Receiving, by the server, the first lost-of-contact distress signal from the first mobile terminal, and broadcasting a help-retrieving request based on the first lost-of-contact distress signal    802

Receiving, by the second control terminal, the first help-retrieving request broadcast by the server, and sends a first confirmation help message to the server, wherein the first confirmation help message indicates that the second control terminal agrees to help retrieve the first mobile terminal    803

Receiving, by the server, a first confirmation help message from the second control terminal, and sending the first confirmation help message to the first control terminal.    804

Controlling, by the second control terminal, the first mobile terminal to move to the current position of the first control terminal    805

FIG. 8

First lost-of-contact distress signal

First help-retrieving request

First confirmation help message

METHOD AND SYSTEM FOR RETRIEVING LOST-OF-CONTACT MOBILE TERMINAL, DEVICE, AND STORAGE MEDIUM

CROSS-REFERENCE TO RELATED APPLICATION

The present disclosure is a U.S. national phase application based on PCT/CN2022/120003, filed on Sep. 20, 2022, which is based on and claims priority to Chinese Patent Application No. 202111617787.2 filed on Dec. 27, 2021 and entitled "METHOD, APPARATUS, AND SYSTEM FOR RETRIEVING LOST-OF-CONTACT MOBILE TERMINAL, DEVICE, AND STORAGE MEDIUM," all of which are hereby incorporated by reference in their entireties for all purposes.

TECHNICAL FIELD

The present disclosure relates to the field of unmanned aerial vehicles technologies, and in particular, relates to a method, an apparatus and a system for retrieving a lost-of-contact mobile terminal, a device, and a storage medium.

BACKGROUND

For mobile terminals, such as unmanned aerial vehicles and unmanned vehicles, a user controls a mobile terminal to execute a corresponding action through a control terminal. However, during an operation of the mobile terminal, the mobile terminal may be disconnected from the control terminal due to power failure, unstable signal, explosion, and the like.

SUMMARY

Embodiments of the present disclosure provide a method, an apparatus and a system for retrieving a lost-of-contact mobile terminal, a device, and a storage medium. The technical solutions are as follows.

In one aspect, a method for retrieving a lost-of-contact mobile terminal is provided. The method is applied to a first control terminal, and includes:

receiving a first lost-of-contact distress signal from a first mobile terminal forwarded by a server, wherein the first lost-of-contact distress signal indicates that the first mobile terminal is disconnected from the first control terminal;

displaying a help seeking interface, wherein the help seeking interface is configured to determine whether the first control terminal chooses to retrieve the first mobile terminal by itself or request other control terminals to help retrieve the first mobile terminal;

sending, in response to a help-retrieving instruction, a first help-retrieving request to the server; and receiving a first confirmation help message from a second control terminal from the server, wherein the first confirmation help message indicates that the second control terminal agrees to help retrieve the first mobile terminal.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

Optionally, the method further includes:

receiving a second help-retrieving request from the server, wherein the second help-retrieving request indicates that the second control terminal requests to help retrieve a disconnected second mobile terminal;

displaying a request help interface, wherein the request help interface is configured to determine whether the first control terminal agrees to help retrieve the second mobile terminal;

sending, in response to a confirmation help instruction, a second confirmation help message to the server, wherein the second confirmation help message indicates that the first control terminal agrees to help retrieve the second mobile terminal; and controlling the second mobile terminal to move to a current position of the second control terminal.

Optionally, the first control terminal interacts with the first mobile terminal by means of radio communication, and the method further includes:

sending a control signal to the first mobile terminal via a first channel to control the first mobile terminal, wherein the first channel is a communication channel between the first mobile terminal and the first control terminal;

receiving image-transmitting data from the first mobile terminal via the first channel, wherein the image-transmitting data includes video data and sensor data, the video data being data acquired by a first person main view FPV camera on the first mobile terminal, and the sensor data being data acquired by a sensor on the first mobile terminal; and displaying the video data and the sensor data.

Optionally, prior to sending the control signal to the first mobile terminal via the first channel, the method further includes:

receiving a pairing message broadcast by the first mobile terminal, wherein the pairing message includes an identity identifier of the first mobile terminal and the channel information of the first channel;

displaying a pairing interface, wherein the pairing interface includes the identity identifier of the first mobile terminal and the channel information of the first channel;

sending, in response to a pairing instruction, a pairing request to the first mobile terminal, wherein the pairing request includes an identity identifier of the first control terminal, a control mode expected by the first control terminal, the channel information of the first channel, and the identity identifier of the first mobile terminal; and receiving a pairing success response from the first mobile terminal, wherein the pairing success response indicates that the first mobile terminal has authorized the first control terminal to use the control mode for control.

In another aspect, a method for retrieving a lost-of-contact mobile terminal is provided. The method is applied to a server, and includes:

receiving a first lost-of-contact distress signal from a first mobile terminal, wherein the first lost-of-contact distress signal indicates that the first mobile terminal is disconnected from a first control terminal;

broadcasting a first help-retrieving request based on the first lost-of-contact distress signal, wherein the first help-retrieving request is configured to request other control terminals to help retrieve the first mobile terminal;

receiving a first confirmation help message from a second control terminal, wherein the first confirmation help message indicates that the second control terminal agrees to help retrieve the first mobile terminal; and sending the first confirmation help message to the first control terminal.

Optionally, broadcasting the first help-retrieving request based on the first lost-of-contact distress signal includes:

broadcasting the first lost-of-contact distress signal, or sending the first lost-of-contact distress signal to the first control terminal, wherein the first lost-of-contact distress signal is configured to determine whether the first control terminal chooses to retrieve the first mobile terminal by itself or request other control terminals to help retrieve the first mobile terminal; and receiving and broadcasting the first help-retrieving request from the first control terminal.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

In another aspect, an apparatus for retrieving a lost-of-contact mobile terminal is provided. The apparatus is applied to a first control terminal, and includes:

a first receiving module, configured to receive a first lost-of-contact distress signal from a first mobile terminal forwarded by a server, wherein the first lost-of-contact distress signal indicates that the first mobile terminal is disconnected from the first control terminal;

a first displaying module, configured to display a help seeking interface, wherein the help seeking interface is configured to determine whether the first control terminal chooses to retrieve the first mobile terminal by itself or request other control terminals to help retrieve the first mobile terminal;

a first sending module, configured to send, in response to a help-retrieving instruction, a first help-retrieving request to the server; and a second receiving module, configured to receive a first confirmation help message from a second control terminal from the server, wherein the first confirmation help message indicates that the second control terminal agrees to help retrieve the first mobile terminal.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

Optionally, the apparatus further includes:

a third receiving module, configured to receive a second help-retrieving request from the server, wherein the second help-retrieving request indicates that the second control terminal requests to help retrieve a disconnected second mobile terminal;

a second displaying module, configured to display a request help interface, wherein the request help interface is configured to determine whether the first control terminal agrees to help retrieve the second mobile terminal;

a second sending module, configured to send, in response to a confirmation help instruction, a second confirmation help message to the server, wherein the second confirmation help message indicates that the first control terminal agrees to help retrieve the second mobile terminal; and a controlling module, configured to control the second mobile terminal to move to a current position of the second control terminal.

Optionally, the first control terminal interacts with the first mobile terminal by means of radio communication, and the apparatus further includes:

a third sending module, configured to send a control signal to the first mobile terminal via a first channel to control the first mobile terminal, wherein the first channel is a communication channel between the first mobile terminal and the first control terminal;

a fourth receiving module, configured to receive image-transmitting data from the first mobile terminal via the first channel, wherein the image-transmitting data includes video data and sensor data, the video data being data acquired by a first person main view FPV camera on the first mobile terminal, and the sensor data being data acquired by a sensor on the first mobile terminal; and a third displaying module, configured to display the video data and the sensor data.

Optionally, the apparatus further includes:

a fifth receiving module, configured to receive a pairing message broadcast by the first mobile terminal, wherein the pairing message includes an identity identifier of the first mobile terminal and channel information of the first channel;

a fourth displaying module, configured to display a pairing interface, wherein the pairing interface includes the identity identifier of the first mobile terminal and the channel information of the first channel;

a fourth sending module, configured to send, in response to a pairing instruction, a pairing request to the first mobile terminal, wherein the pairing request includes an identity identifier of the first control terminal, a control mode expected by the first control terminal, the channel information of the first channel, and the identity identifier of the first mobile terminal; and a sixth receiving module, configured to receive a pairing success response from the first mobile terminal, wherein the pairing success response indicates that the first mobile terminal has authorized the first control terminal to use the control mode for control.

In another aspect, an apparatus for retrieving a lost-of-contact mobile terminal is provided. The apparatus is applied to a server, and includes:

a first receiving module, configured to receive a first lost-of-contact distress signal from a first mobile terminal, wherein the first lost-of-contact distress signal indicates that the first mobile terminal is disconnected from a first control terminal;

a broadcasting module, configured to broadcast a first help-retrieving request based on the first lost-of-contact distress signal, wherein the first help-retrieving request is configured to request other control terminals to help retrieve the first mobile terminal;

a second receiving module, configured to receive a first confirmation help message from a second control terminal, wherein the first confirmation help message indicates that the second control terminal agrees to help retrieve the first mobile terminal; and a sending module, configured to send the first confirmation help message to the first control terminal.

Optionally, the broadcasting module is specifically configured to:

broadcast the first lost-of-contact distress signal, or send the first lost-of-contact distress signal to the first control terminal, wherein the first lost-of-contact distress signal is configured to determine whether the first control terminal chooses to retrieve the first mobile terminal by itself or request other control terminals to help retrieve the first mobile terminal; and receive and broadcast the first help-retrieving request from the first control terminal.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

In another aspect, a system for retrieving a lost-of-contact mobile terminal is provided. The system includes a first mobile terminal, a first control terminal, and a server, wherein the first mobile terminal sends a first lost-of-contact distress signal to the server, wherein the first lost-of-contact distress signal indicates that the first mobile terminal is disconnected from the first control terminal;

the server receives the first lost-of-contact distress signal, and sends the first lost-of-contact distress signal to the first control terminal;

the first control terminal receives the first lost-of-contact distress signal, and displays a help seeking interface, wherein the help seeking interface is configured to determine whether the first control terminal chooses to retrieve the first mobile terminal by itself or request other control terminals to help retrieve the first mobile terminal;

the first control terminal sends, in response to a help-retrieving instruction, a first help-retrieving request to the server, wherein the first help-retrieving request is configured to request other control terminals to help retrieve the first mobile terminal;

the server receives and broadcasts the first help-retrieving request; and the server receives a first confirmation help message from a second control terminal, and sends the first confirmation help message to the first control terminal, wherein the first confirmation help message indicates that the second control terminal agrees to help retrieve the first mobile terminal.

Optionally, the first control terminal interacts with the first mobile terminal by means of radio communication;

the first control terminal sends a control signal to the first mobile terminal via a first channel, wherein the first channel is a communication channel between the first mobile terminal and the first control terminal;

the first mobile terminal receives the control signal via the first channel, and executes a corresponding action according to the control signal;

the first mobile terminal sends image-transmitting data to the first control terminal via the first channel, wherein the image-transmitting data includes video data and sensor data, the video data being data acquired by a first person main view FPV camera on the first mobile terminal, and the sensor data being data acquired by a sensor on the first mobile terminal; and the first control terminal receives the image-transmitting data via the first channel, and displays the video data and the sensor data.

In another aspect, a computer device is provided. The computer device includes a memory and a processor, wherein the memory is configured to store a computer program, and the processor is configured to execute the computer program stored in the memory, to perform the above method for retrieving the lost-of-contact mobile terminal. The computer device is the above first control terminal or the above server.

In another aspect, a computer-readable storage medium is provided. The storage medium stores a computer program, wherein the computer program, when executed by a processor, causes the processor to perform the above method for retrieving the lost-of-contact mobile terminal.

In another aspect, a computer program product containing at least one instruction is provided. The at least one instruction, when executed on a computer, causes the computer to perform the above method for retrieving the lost-of-contact mobile terminal. In other words, a computer program is provided, wherein the computer program, when executed on a computer, causes the computer to perform the above method for retrieving the lost-of-contact mobile terminal.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

FIG. 3 is a flowchart of a method for controlling a mobile terminal according to embodiments of the present disclosure;

FIG. 8 is a flowchart of a method for retrieving a lost-of-contact mobile terminal according to embodiments of the present disclosure;

DETAILED DESCRIPTION

To make the objects, technical solutions, and advantages of the present disclosure clearer, embodiments of the present disclosure are further described in detail below with reference to the accompanying drawings. Prior to explaining a method provided in the embodiments of the present disclosure in detail, a system architecture provided in the embodiments of the present disclosure is introduced.

In related art, the user retrieves the mobile terminal through positioning information of the mobile terminal displayed on a display, retrieves the mobile terminal through flashing light and beeping of the mobile terminal, or retrieves the mobile terminal through an intelligent return of the mobile terminal.

However, in the case that the mobile terminal is retrieved by the above methods, it is easily to be limited by a use scenario. For example, when the user retrieves the mobile terminal through the intelligent return of the mobile terminal, the user touches the control terminal by accident and the intelligent return of the mobile terminal is interrupted, such that the mobile terminal fails to be retrieved.

Figure 1:
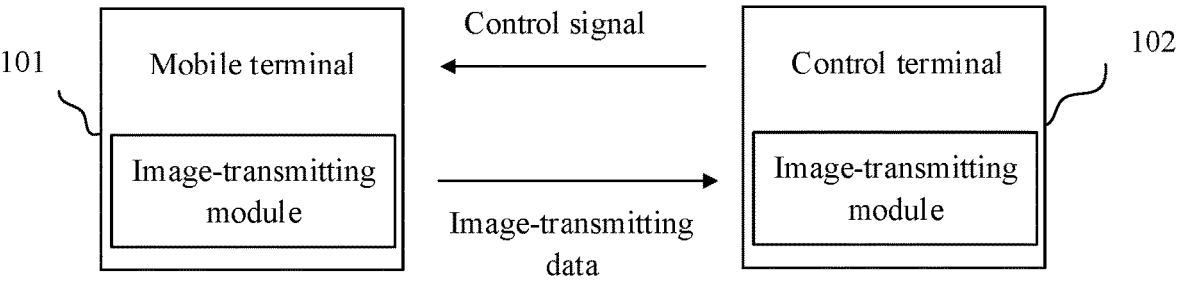
FIG. 1 is a schematic diagram of a system architecture according to embodiments of the present disclosure.

Referring to FIG. 1, FIG. 1 is a schematic diagram of a system architecture according to an exemplary embodiment. The system includes a mobile terminal 101 and a control terminal 102. The mobile terminal 101 interacts with the control terminal 102 by means of radio communication, and the control terminal 102 is a device integrated with a control function and a display function.

The mobile terminal 101 sends image-transmitting data including video data and sensor data to the control terminal 102 via a radio communication channel. Upon receiving the video data and the sensor data from the mobile terminal 101, the control terminal 102 displays the video data and the sensor data. A user sends a control signal to the mobile terminal 101 through the video data and the sensor data displayed by the control terminal 102, and the mobile terminal 101 executes a corresponding action upon receiving the control signal from the control terminal 102 via the radio communication channel.

Optionally, the mobile terminal 101 is disconnected from the control terminal 102 due to power failure, unstable signal, explosion, and the like. In this case, the system further includes a server 103. The mobile terminal 101 and the control terminal 102 are each communicatively connected with the server 103. The communication connection is a wired connection or a wireless connection, for example, the communication connection is performed in a manner of internet of things, and the manner of the communication connection is not limited in the embodiments of the present disclosure.

Upon the mobile terminal 101 being disconnected from the control terminal 102, the mobile terminal 101 sends a lost-of-contact distress signal to the control terminal 102 through the server 103, and upon the control terminal 102 receiving the lost-of-contact distress signal, the mobile terminal 101 is retrieved based on the lost-of-contact distress signal.

Figure 2:
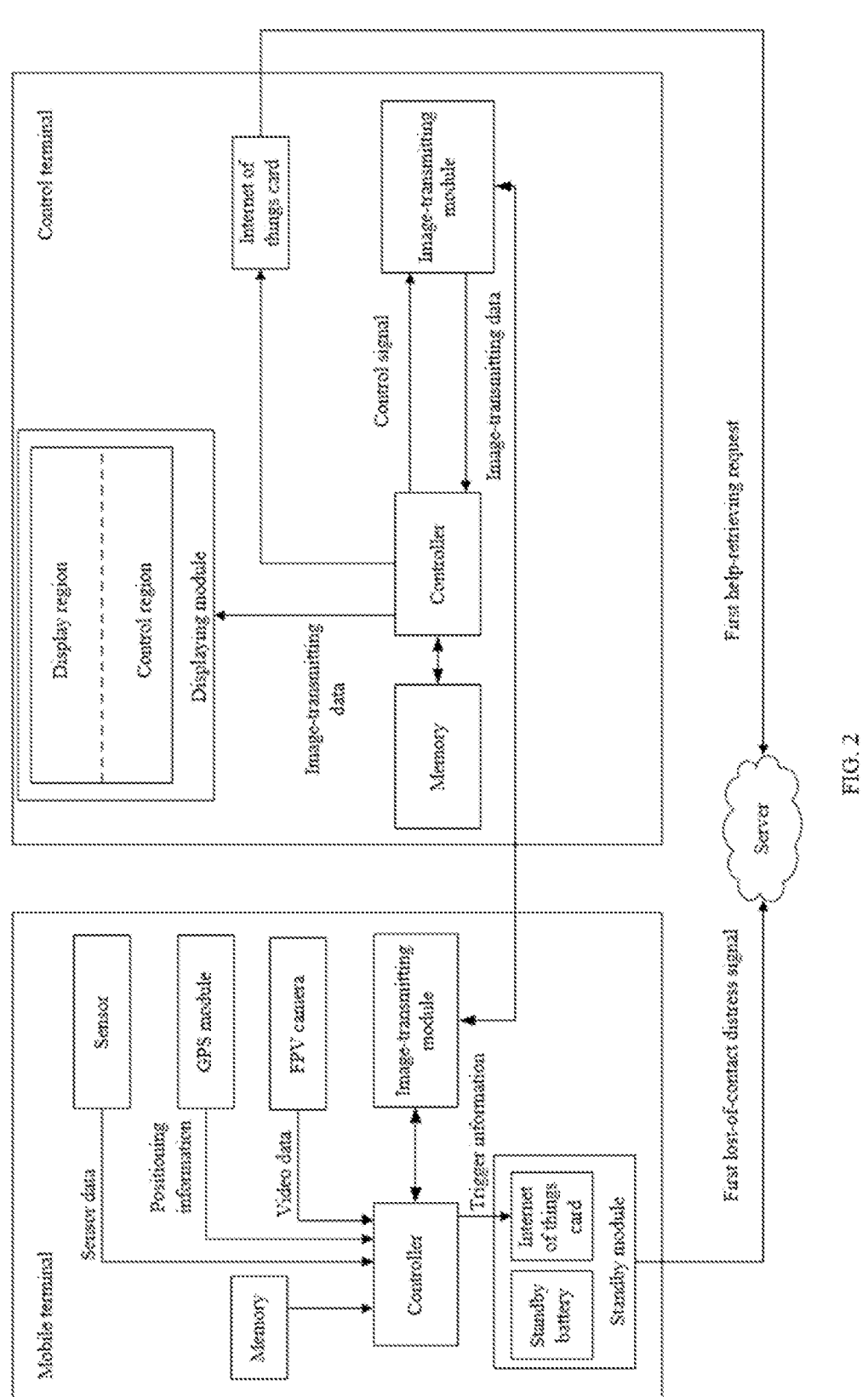
FIG. 2 is a schematic structural diagram of a mobile terminal and a control terminal according to embodiments of the present disclosure.

Referring to FIG. 2, FIG. 2 is a schematic structural diagram of a mobile terminal and a control terminal according to an exemplary embodiment. The mobile terminal includes a sensor, a global positioning system (GPS) module, a first person main view (FPV) camera, an image-transmitting module, a memory, a controller, and a standby module, and the control terminal includes a displaying module, a memory, a controller, an image-transmitting module, and an internet of things card. The standby module of the mobile terminal includes the internet of things card.

The FPV camera on the mobile terminal acquires the video data and sends the video data to the controller, and the sensor acquires the sensor data and sends the sensor data to the controller. Upon receiving the video data and the sensor data, the controller codes the video data and the sensor data to acquire image-transmitting data. The controller sends the image-transmitting data to the image-transmitting module of the control terminal through the image-transmitting module of the mobile terminal.

Upon receiving the image-transmitting data, the image-transmitting module of the control terminal sends the image-transmitting data to the controller. Upon receiving the image-transmitting data, the controller decodes the image-transmitting data to acquire the video data and the sensor data, and displays the video data and the sensor data through the displaying module. Moreover, the controller further sends the control signal to the image-transmitting module of the mobile terminal through the image-transmitting module of the control terminal. Upon receiving the control signal, the image-transmitting module of the mobile terminal sends the control signal to the controller, and the controller processes the control signal to control the mobile terminal by the control terminal.

In the case that the mobile terminal is disconnected from the control terminal, the GPS module of the mobile terminal determines its current positioning information, and the controller of the mobile terminal sends a trigger signal to the standby module. Upon receiving the trigger signal, the standby module sends the lost-of-contact distress signal to the server through the internet of things card. The lost-of-contact distress signal at least includes an identity identifier of the mobile terminal, an identity identifier of the control terminal, and current positioning information of the mobile terminal. Upon receiving the lost-of-contact distress signal, the server sends the lost-of-contact distress signal to the control terminal. Upon the control terminal receiving the lost-of-contact distress signal from the server, in the case that the control terminal chooses to request other control terminals to help retrieve the mobile terminal, the control terminal sends a help-retrieving request to the server through the internet of things card, wherein the help-retrieving request at least includes authorization information, channel information of the radio communication channel, and the current positioning information of the control terminal, such that other control terminals control the mobile terminal to move to a current position of the control terminal via the radio communication channel, and retrieving the lost-of-contact mobile terminal is achieved.

The controller of the mobile terminal is a microcontroller unit (MCU), and the controller of the control terminal is a timer control register (TCON). In addition, the controller of the mobile terminal and the controller of the control terminal can also be other devices having the above-mentioned functions.

The image-transmitting module of the mobile terminal and the image-transmitting module of the control terminal uses a coded orthogonal frequency division multiplexing (COFDM) method to transmit the image-transmitting data. In addition, other methods can also be used to transmit the image-transmitting data.

The memory of the mobile terminal and the memory of the control terminal are a read only memory (ROM), a flash memory, and the like. Moreover, the memory of the mobile terminal stores an identity identifier of the mobile terminal, and the memory of the control terminal stores an identity identifier of the control terminal. In addition, upon the mobile terminal and the control terminal being paired, the memory of the mobile terminal further stores the identity identifier of the control terminal, and the memory of the control terminal further stores the identity identifier of the mobile terminal. It should be understood that the memory of the mobile terminal and the memory of the control terminal further store other data, which is not limited in the embodiments of the present disclosure.

The displaying module of the control terminal includes a display region and a control region, in the case that the control terminal displays the video data and the sensor data, the video data and the sensor data are displayed in the display region at the same time, the video data is also displayed in the display area region and the sensor data is displayed in the control region, which are not limited in the embodiments of the present disclosure.

Optionally, the standby module of the mobile terminal further includes a standby battery. In this way, in the case that the mobile terminal is disconnected from the control terminal due to power failure, the mobile terminal can be powered by the standby battery to send the lost-of-contact distress signal to the server, thus providing a guarantee for the control terminal to retrieve the mobile terminal.

The mobile terminal 101 is an unmanned aerial vehicle, an unmanned car, and the like. The control terminal 102 is any electronic product capable of performing human-computer interaction with a user using one or more methods through a touch pad, a touch screen, and the like, for example, a personal computer (PC), a mobile phone, a smart phone, a personal digital assistant (PDA), a wearable device, a pocket PC (PPC), a tablet computer, a smart car machine, and the like.

The server 103 is an independent server, a server cluster, or a distributed system composed of a plurality of physical servers, a cloud server providing basic cloud computing services, such as a cloud service, a cloud database, cloud computing, a cloud function, cloud storage, a network service, cloud communication, a middleware service, a domain name service, a security service, a content delivery network (CDN), big data and artificial intelligence platform, or a cloud computing service center.

Those skilled in the art understand that the mobile terminal 101, the control terminal 102, and the server 103 are only examples, and other existing or hereafter-existing mobile terminals, control terminals, or servers suitable for the embodiments of the present disclosure are included in the protection scope of the embodiments of the present disclosure, and are included herein by reference.

It should be noted that the system architecture described in the embodiments of the present disclosure is for more clearly illustrating the technical solutions in the embodiments of the present disclosure, and does not constitute a limitation to the technical solutions according to the embodiments of the present disclosure, and a person having ordinary skill in the art knows that as the system architecture evolves, the technical solutions according to the embodiments of the present disclosure are also applicable to similar technical problems.

The method according to the embodiments of the present disclosure includes two stages, namely control of the mobile terminal and retrieving the lost-of-contact mobile terminal. Therefore, the following description is separately provided.

First, a method for controlling a mobile terminal according to the embodiments of the present disclosure is explained in detail. FIG. 3 is a flowchart of a method for controlling a mobile terminal according to embodiments of the present disclosure, referring to FIG. 3, the method includes the following steps.

In step 301, a first control terminal sends a control signal to a first mobile terminal via a first channel to control the first mobile terminal, wherein the first channel is a communication channel between the first mobile terminal and the first control terminal.

The control signal carries mobility control information, shooting control information, and perception control information. The mobility control information is configured to control the first mobile terminal to move, and the mobility control information includes intelligent return control information, emergency stop control information, mode switch information, mobility operation control information, and the like. For example, the first mobile terminal is an unmanned aerial vehicle, and the mobility control information includes intelligent return flight control information, emergency hovering control information, airplane mode switch information, and mobility operation control information, such as ascending, descending, advancing, retreating, and left-right traversing.

The shooting control information is configured to control the first mobile terminal to shoot, and the shooting control information includes photographing control information, video recording control information, night vision control information, pan tilt control information, and the like. The perception control information is configured to control the first mobile terminal to perceive, and the perception control information includes downward-looking light supplement control information.

Optionally, the control signal further carries an identity identifier of the first control terminal, and may further carry other information, for example, attribute information of the first control terminal, wherein the attribute information includes information of a manufacturer, a brand, a model, and the like.

In some embodiments, the first control terminal generates the control signal according to a certain information format. The information format includes a control field, and the control field carries the mobility control information, the shooting control information, and the perception control information.

Optionally, the information format further includes an information header field and an identity field, wherein the information header field carries the attribute information of the first control terminal, and the identity field carries the identity identifier of the first control terminal. In addition, the information format further includes other fields, which are not limited in the embodiments of the present disclosure.

It is noted that the information format is generally fixed, but an action that the first control terminal controls the first mobile terminal to execute is generally variable, that is, values of the selection information, the mobility control information, the shooting control information, and the perception control information carried in the above control field are generally variable. That is, in the case that the first control terminal controls the first mobile terminal to execute some actions, the values of the control information corresponding to the actions in the control field are valid values, and the values of the other control information are invalid values. For example, a valid value is 1, an invalid value is 0, and in the case that a value of a certain control information is 1, it indicates that the control information is valid control information, and the first control terminal needs to control the first mobile terminal to execute the action corresponding to the control information. In the case that the value of the control information is 0, it indicates that the control information is invalid control information, and the first control terminal does not need to control the first mobile terminal to execute the action corresponding to the control information.

Figure 4:
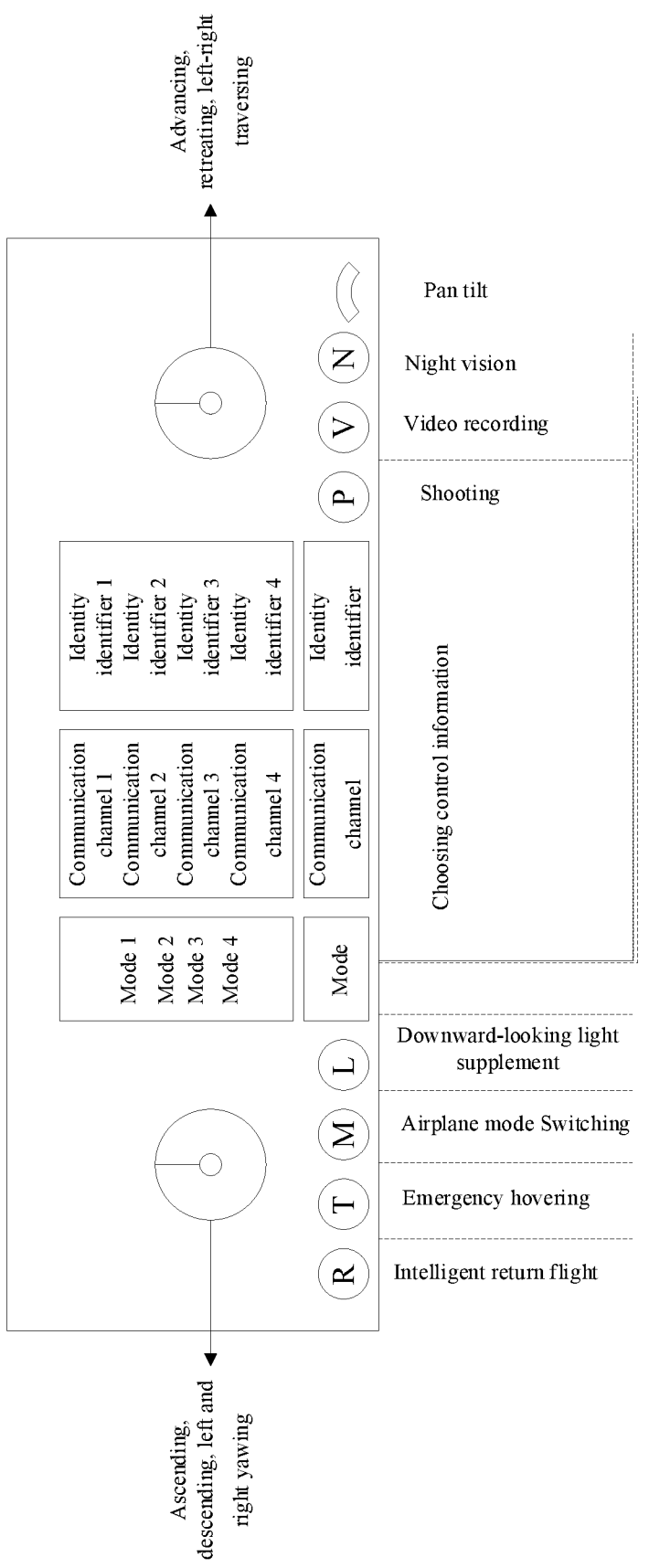
FIG. 4 is a schematic diagram of an interface for controlling an unmanned aerial vehicle according to embodiments of the present disclosure.

Exemplarily, the first mobile terminal is the unmanned aerial vehicle, referring to FIG. 4, and FIG. 4 is a schematic diagram of an interface for controlling an unmanned aerial vehicle according to embodiments of the present disclosure. In FIG. 4, R represents intelligent return flight, T represents emergency hovering, M represents flight mode switching, L represents downward-looking light supplement, P represents shooting, V represents video recording, and N represents night vision. A user controls the unmanned aerial vehicle through the buttons, and in the case that the first control terminal detects a choosing operation of the user, the control signal is generated and sent to the unmanned aerial vehicle via the first channel. Assuming that the user needs to control the unmanned aerial vehicle to perform an intelligent return flight at present, and in this case, a value of the intelligent return flight control information carried by the control field included in the control signal is 1, and values of other control information are 0.

In the case that the first control terminal is successfully paired with the first mobile terminal, and the first control terminal communicates with the first mobile terminal via the first channel, the first control terminal sends the control signal to the first mobile terminal via the first channel. Therefore, prior to sending the control signal to the first mobile terminal via the first channel, the first control terminal needs to be paired with the first mobile terminal.

An implementation process of pairing the first control terminal with the first mobile terminal includes: broadcasting, by the first mobile terminal, a pairing message, wherein the pairing message includes the identity identifier of the first mobile terminal and the channel information of the first channel; receiving, by the first control terminal, the pairing message broadcast by the first mobile terminal, displaying a pairing interface, wherein the pairing interface includes the identity identifier of the first mobile terminal and the channel information of the first channel, and sending, in response to a pairing instruction, a pairing request to the first mobile terminal, wherein the pairing request includes the identity identifier of the first control terminal, a control mode expected by the first control terminal, the channel information of the first channel, and the identity identifier of the first mobile terminal; receiving, by the first mobile terminal, a pairing request from the first control terminal, and sends a pairing success response to the first control terminal based on the pairing request, wherein the pairing success response indicates that the first mobile terminal has authorized the first control terminal to adopt the control mode for control; and receiving, by the first control terminal, the pairing success response from the first mobile terminal.

Upon the first mobile terminal being powered on, the pairing message is generated and broadcast, such that a plurality of control terminals can receive the pairing message. Upon receiving the pairing message broadcast by the first mobile terminal, the first control terminal displays the pairing interface, wherein the pairing interface includes the identity identifier of the first mobile terminal and the channel information of the first channel. Moreover, the pairing interface further includes the control mode for the user to choose. Upon the user choosing an expected control mode, in the case that the first control terminal detects a pairing operation of the user, a pairing request is sent to the first mobile terminal, wherein the pairing request includes the identity identifier of the first control terminal, the control mode expected by the first control terminal, the channel information of the first channel, and the identity identifier of the first mobile terminal. Upon receiving the pairing request from the first control terminal, the first mobile terminal pairs and binds the first mobile terminal and the first control terminal, and sends a pairing success response to the first control terminal, wherein the pairing success response indicates that the first mobile terminal has authorized the first control terminal to adopt the control mode for control. The first control terminal receives the pairing success response from the first mobile terminal.

In some embodiments, an implementation process of generating the pairing message by the first mobile terminal includes: performing, by the first mobile terminal, channel coding on the identity identifier of the first mobile terminal and the channel information of the first channel to acquire a channel coding signal; performing spread spectrum on the channel coding signal, that is, spreading the channel coding signal into a broadband signal by using a spread spectrum function; interleaving the broadband signal, that is, rearranging the broadband signal according to a certain rule to acquire a rearranged signal; and modulating the rearranged signal by using a digital signal to acquire the pairing message.

Optionally, the pairing message broadcast by the first mobile terminal further carries other information, for example, attribute information of the first mobile terminal, wherein the attribute information includes information of a manufacturer, a brand, a model, and the like.

In some embodiments, the first mobile terminal generates the pairing message according to a certain information format. The information format includes an identity field and a sensor field. The identity field carries the identity identifier of the first mobile terminal, and the sensor field carries the channel information of the first channel.

Optionally, the information format further includes the information header field, wherein the information header field carries the attribute information of the first mobile terminal, in addition, the information format may further include other fields, which are not limited in the embodiments of the present disclosure.

It is noted that the information format is generally fixed, but the pairing message broadcast by the first mobile terminal does not carry all the information. That is, values of each of the fields in the information format are not all valid values. That is, the first mobile terminal carries information in the pairing message, and values in the fields corresponding to the information are valid values, and values in the other fields are invalid values. For example, the valid value is 1, the invalid value is 0, and in the case that the value of a certain field is 1, it indicates that the pairing message carries corresponding information. In the case that the value of a certain field is 0, it indicates that the pairing message does not carry corresponding information.

Figure 5:
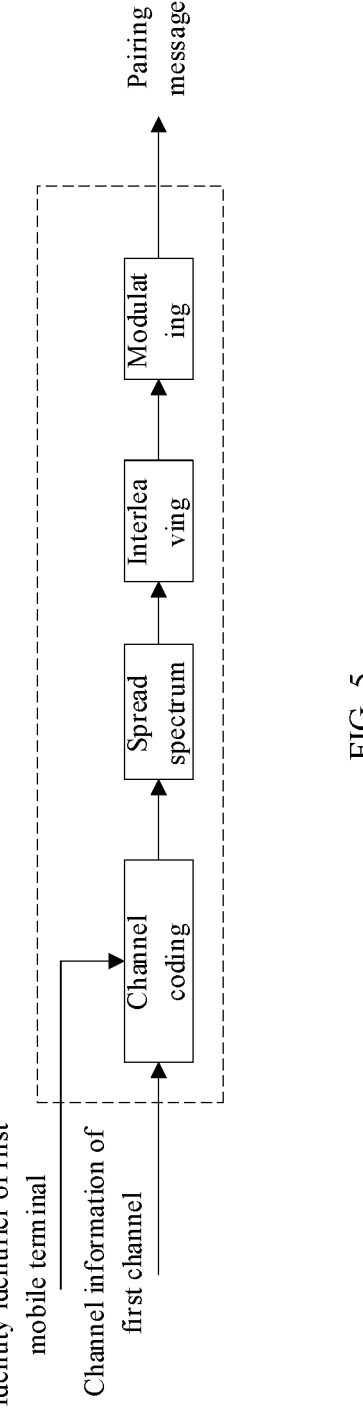
FIG. 5 is a schematic diagram of generating a pairing message according to embodiments of the present disclosure.

Exemplarily, referring to FIG. 5, and FIG. 5 is a schematic diagram of generating a pairing message according to embodiments of the present disclosure. In FIG. 5, the first mobile terminal performs channel coding on an identity identifier of the first mobile terminal and channel information of the first channel to acquire a channel coding signal, and performs spread spectrum on the channel coding signal to acquire a broadband signal. Then, the broadband signal is interleaved to acquire a rearranged signal, and the rearranged signal is modulated to acquire a pairing message.

In some embodiments, upon receiving the pairing message, the first control terminal demodulates the pairing message to acquire the rearranged signal. The rearranged signal is deinterleaved to acquire the broadband signal. The broadband signal is despreaded to acquire the channel coding signal. Channel decoding is performed on the channel coding signal to acquire the identity identifier of the first mobile terminal and the channel information of the first channel.

Optionally, in a process of demodulating the pairing message by the first control terminal, the pairing message is compensated by channel estimation and channel equalization to acquire a complete pairing message. Moreover, the first control terminal further improves accuracy of information carried by the pairing message through timing and synchronization in the processes of demodulation, deinterleaving, and despreading.

Figure 6:
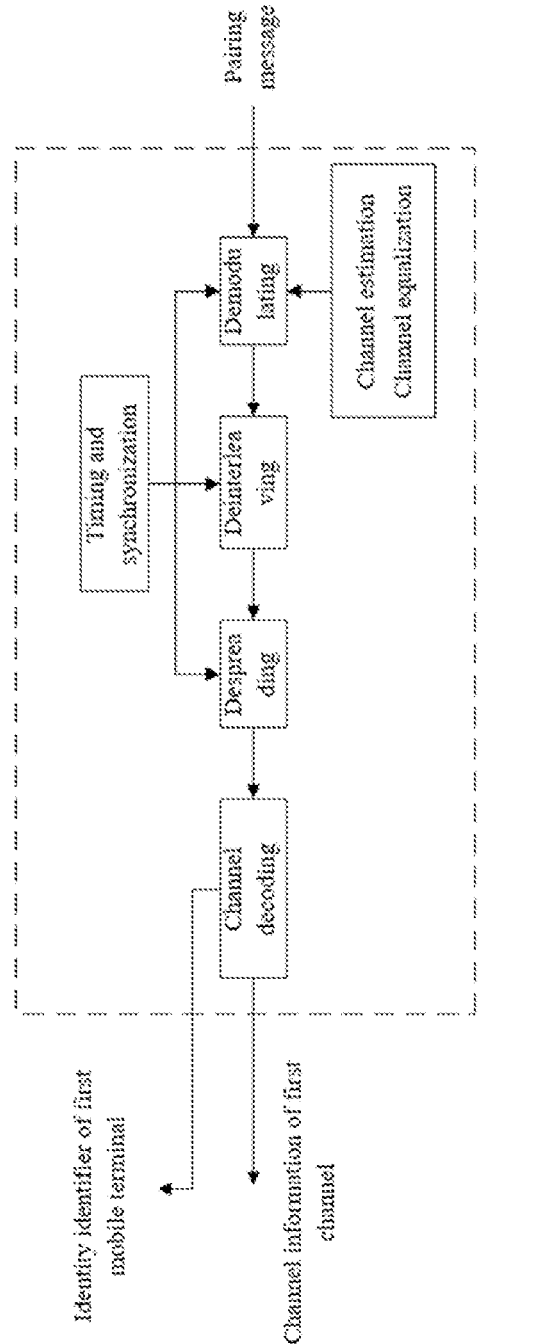
FIG. 6 is a schematic diagram of decoding a pairing message according to embodiments of the present disclosure.

Exemplarily, referring to FIG. 6, and FIG. 6 is a schematic diagram of decoding a pairing message according to embodiments of the present disclosure. In FIG. 6, the first control terminal demodulates a pairing message to acquire a rearranged signal. The rearranged signal is deinterleaved to acquire a broadband signal. The broadband signal is despreaded to acquire a channel coding signal. Channel decoding is performed on the channel coding signal to acquire an identity identifier of the first mobile terminal and channel information of the first channel.

In some embodiments, the first control terminal generates the pairing request according to a certain information format. The information format includes an identity field and a control field, wherein the identity field carries the identity identifier of the first control terminal, and the control field carries the control mode expected by the first control terminal, the channel information of the first channel, and the identity identifier of the first mobile terminal.

Optionally, the information format further includes the information header field, wherein the information header field carries the attribute information of the first control terminal, in addition, the information format further includes other fields, which are not limited in the embodiments of the present disclosure.

Upon receiving the pairing request from the first control terminal, the first mobile terminal stores a correspondence between the identity identifier of the first mobile terminal and the identity identifier of the first control terminal. That is, the first mobile terminal and the first control terminal are paired and bound.

Optionally, for improving communication security of the mobile terminal, the pairing success response from the first mobile terminal to the first control terminal further includes first authorization information, wherein the first authorization information is information that the first mobile terminal authorizes the first control terminal to control the first mobile terminal, and the first authorization information is set in advance or generated upon the first mobile terminal being paired and bound with the first control terminal.

The first mobile terminal generates the first authorization information through the identity identifier of the first mobile terminal and the identity identifier of the first control terminal, in addition, the first authorization information is also generated in other manners, which are not limited in the embodiments of the present disclosure.

In step 302, the first mobile terminal receives the control signal from the first control terminal, and executes a corresponding action based on the control signal.

Upon receiving the control signal from the first control terminal, the first mobile terminal parses the control information carried in the control field included in the control signal to acquire valid control information and invalid control information. The first mobile terminal executes the action corresponding to the valid control information based on the valid control information.

In step 303, the first mobile terminal sends image-transmitting data to the first control terminal via the first channel, wherein the image-transmitting data includes video data and sensor data, the video data being data acquired by an FPV camera on the first mobile terminal, and the sensor data being data acquired by a sensor on the first mobile terminal.

The FPV camera on the first mobile terminal acquires the video data, and the sensor on the first mobile terminal acquires the sensor data. The first mobile terminal codes the video data and the sensor data to acquire the image-transmitting data, and sends the image-transmitting data to the first control terminal via the first channel.

In the process that the first mobile terminal codes the video data and the sensor data to acquire the image-transmitting data, channel coding, spreading, interleaving, and modulating are required to be sequentially performed on the video data and the sensor data. The operations are similar to the operation of the first mobile terminal coding the identity identifier of the first mobile terminal and the channel information of the first channel in the above step 301, therefore, reference is made to related contents in the above step 301, and details are not described herein.

In some embodiments, in the case that the first mobile terminal codes the video data, some reserved fields are present. In this case, the first mobile terminal adds the identity identifier and the sensor data of the first mobile terminal to the reserved field, and codes the identity identifier and the sensor data of the first mobile terminal, which is not limited in the embodiments of the present disclosure.

Optionally, as data volume of the video data is large, for ensuring reliability of communication between the first mobile terminal and the first control terminal, prior to coding the video data and the sensor data by the first mobile terminal, the video data is compressed to acquire compressed video data. Then, the compressed video data and the sensor data are coded by the first mobile terminal, such that the image-transmitting data is acquired.

The sensor data includes channel information of the communication channel, environmental information, and mobility information, wherein the environmental information includes an ambient light intensity, an environmental temperature, and the like, and the mobility information includes a mobility distance, a mobility speed, a remaining power amount, and the like. For example, the first mobile terminal is the unmanned aerial vehicle, the mobility distance is a flying distance and a flying height, the mobility speed is a flying speed, and the remaining power amount is a remaining power amount of the unmanned aerial vehicle.

Optionally, the image-transmitting data further includes the identity identifier of the first mobile terminal, and in addition, the image-transmitting data may further include other information, such as the attribute information of the first mobile terminal, wherein the attribute information includes information of a manufacturer, a brand, a model, and the like.

In some embodiments, the first mobile terminal generates the image-transmitting data according to a certain information format. The information format includes a video field and a sensor field, wherein the video field carries the video data, and the sensor field carries the channel information of the communication channel, the environmental information, and the mobility information.

Based on the above description, the information format further includes the information header field and the identity field, wherein the information header field carries the attribute information of the first mobile terminal, such as information of a manufacturer, a brand, a model, and the like, and the identity field carries an identity identifier of the first mobile terminal.

In step 304, the first control terminal receives the image-transmitting data from the first mobile terminal, and displays the video data and the sensor data included in the image-transmitting data.

Upon receiving the image-transmitting data from the first mobile terminal, the first control terminal decodes the image-transmitting data to acquire the video data and the sensor data, and displays the video data and the sensor data.

In the process that the first control terminal decodes the image-transmitting data to acquire the video data and the sensor data, the image-transmitting data needs to be demodulated, deinterleaved, despreaded, and channel decoded sequentially. The operations are similar to the operation of the first control terminal decoding the pairing message in the above step 301, therefore, related contents in the above step 301 are referred to, and are not described herein.

Figure 7:
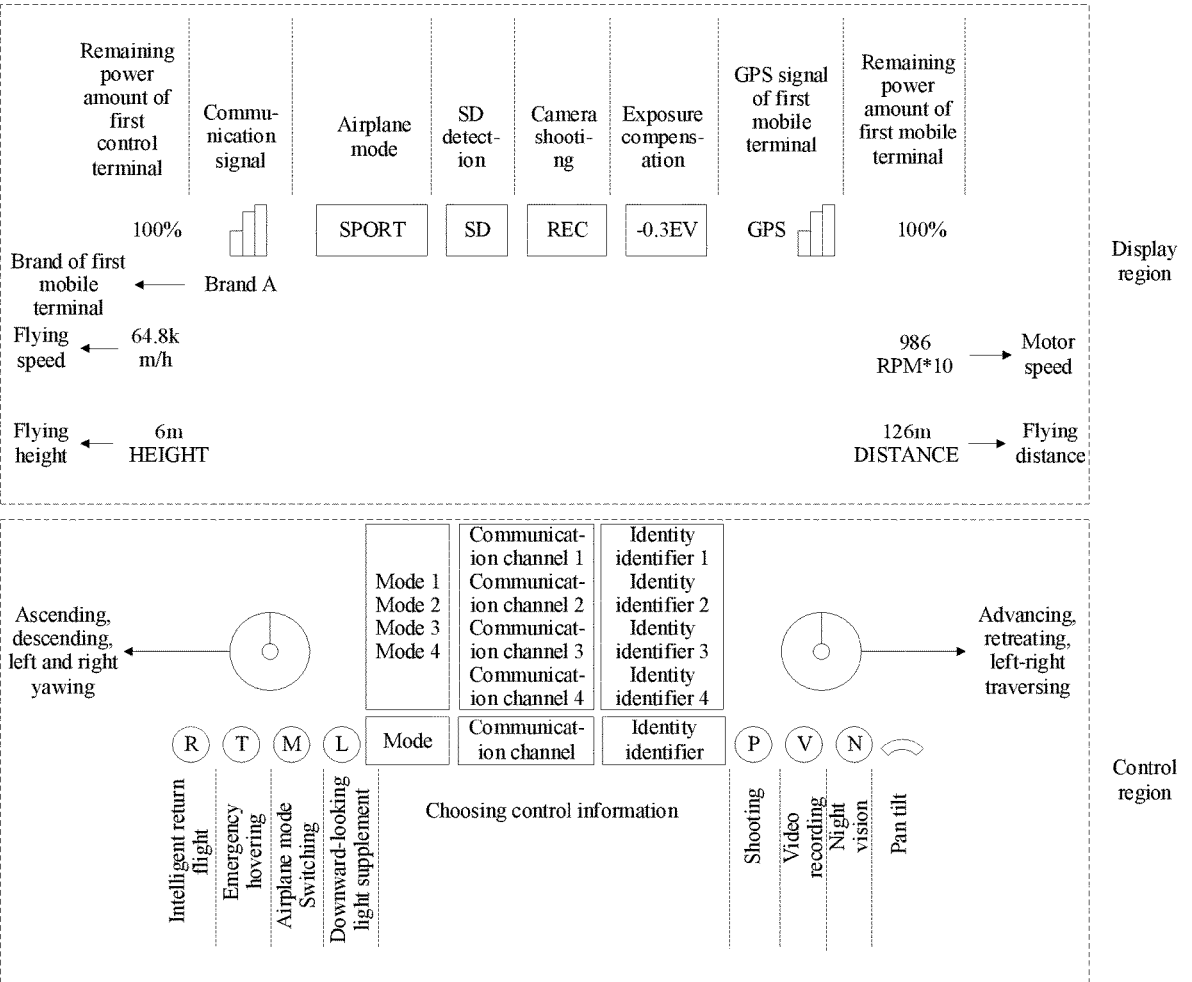
FIG. 7 is a schematic diagram of another interface for controlling an unmanned aerial vehicle according to embodiments of the present disclosure.

Exemplarily, referring to FIG. 7, the first mobile terminal is the unmanned aerial vehicle, and FIG. 7 is a schematic diagram of another interface for controlling the unmanned aerial vehicle according to embodiments of the present disclosure. In FIG. 7, the first control terminal displays video data in the whole interface, and the whole interface is further divided into a control region and a display region, wherein the control region displays a control signal, and the display region displays sensor data. The sensor data includes a brand of the first mobile terminal, a remaining power amount of the first control terminal, a communication signal, an airplane mode, secure digital memory Card (SD) detection, camera shooting, exposure compensation, a GPS signal of the first mobile terminal, a remaining power amount of the first mobile terminal, a flying speed, a motor rotation speed, a flying height, and a flying distance.

It is noted that the control signal and the sensor data are displayed in an on screen display (OSD) manner, and in addition, may be further displayed in other manners, which are not limited in the embodiments of the present disclosure.

As the first control terminal interacts with the first mobile terminal by means of radio communication, in the case that the first control terminal communicates with the first mobile terminal via the first channel, the first control terminal sends the control signal to the first mobile terminal via the first channel and receives the image-transmitting data from the first mobile terminal via the first channel. Therefore, upon the first control terminal displaying the image-transmitting data, the user controls the first mobile terminal to execute the corresponding action through the image-transmitting data displayed by the first control terminal. Moreover, the image-transmitting data from the first mobile terminal includes the video data and the sensor data. That is, the first mobile terminal simultaneously sends the video data and the sensor data to the first control terminal, rather than sending the sensor data to the controller first and then sending the sensor data to the display by the controller, such that a time difference of intermediate transmission of the sensor data is eliminated, and the user conveniently knows a state of the mobile terminal in real-time.

Next, the method for retrieving the lost-of-contact mobile terminal according to the embodiments of the present disclosure is explained in detail, which are for solving a problem that a user fails to retrieve a lost-of-contact mobile terminal in related art. FIG. 8 is a flowchart of a method for retrieving a lost-of-contact mobile terminal according to the embodiments of the present disclosure, referring to FIG. 8, and the method includes the following steps.

In step 801, a first mobile terminal sends a first lost-of-contact distress signal to a server, wherein the first lost-of-contact distress signal indicates that the first mobile terminal is disconnected from the first control terminal.

In a process of operation of the first mobile terminal, the first mobile terminal fails to send the image-transmitting data via the first channel due to shutdown, module damage, network breaking, explosion, and the like, causing that the first mobile terminal is disconnected from the first control terminal. Alternatively, a distance between the first mobile terminal and the first control terminal is greater than a distance threshold value, and the first control terminal fails to receive the image-transmitting data from the first mobile terminal via the first channel, causing that the first mobile terminal is disconnected from the first control terminal. Upon the first mobile terminal being disconnected from the first control terminal, for facilitating the first control terminal to retrieve the first mobile terminal, the first mobile terminal sends the first lost-of-contact distress signal to the server.

Taking the structure of the mobile terminal and the control terminal shown in FIG. 2 as an example, upon the first mobile terminal being disconnected from the first control terminal, the controller of the first mobile terminal sends a trigger signal to the standby module, and upon receiving the trigger signal, the standby module sends the first lost-of-contact distress signal to the server through the internet of things card.

The above description is taken as an example that upon the first mobile terminal being disconnected from the first control terminal, the controller of the first mobile terminal sends the trigger signal to the standby module. That is, the controller of the first mobile terminal sends the trigger signal to the standby module only in the case that the first mobile terminal is disconnected. In practice, the controller of the first mobile terminal continuously sends the trigger signal to the standby module. Moreover, in the case that the controller of the first mobile terminal determines that the communication between the first mobile terminal and the first control terminal is normal, the trigger signal sent to the standby module is a first signal. In the case that the controller of the first mobile terminal determines that the communication between the first mobile terminal and the first control terminal is abnormal, and duration of the abnormal communication is greater than a duration threshold value, the trigger signal sent to the standby module is a second signal. In this way, upon receiving the trigger signal, the standby module determines whether to send the first lost-of-contact distress signal to the server based on the trigger signal. That is, in the case that the trigger signal received by the standby module is the first signal, it indicates that the communication between the first mobile terminal and the first control terminal is normal, and the standby module does not send the first lost-of-contact distress signal to the server. In the case that the trigger signal received by the standby module is the second signal, it indicates that the first mobile terminal is disconnected from the first control terminal, and the standby module sends the first lost-of-contact distress signal to the server.

The standby module is only for sending the first lost-of-contact distress signal to the server, that is, the data volume transmitted by the standby module is small, and the power consumption is low. In this way, the standby module provides a guarantee for the first mobile terminal to send the first lost-of-contact distress signal to the server.

The first signal is a low-level signal, and the second signal is a high-level signal. That is, the first signal is 0 and the second signal is 1. In addition, the first signal and the second signal can be reversed or other signals. A duration threshold value is set in advance, for example, 10 s, and the duration threshold value is adjustable according to different requirements.

The first lost-of-contact distress signal at least includes an identity identifier of the first mobile terminal, an identity identifier of the first control terminal, and current positioning information of the first mobile terminal.

Optionally, the first lost-of-contact distress signal further includes a status identifier of the first mobile terminal, wherein the status identifier of the first mobile terminal indicates that the first mobile terminal is disconnected from the first control terminal. The first lost-of-contact distress signal further includes a lost-of-contact reason identifier of the first mobile terminal, wherein a lost-of-contact reason identifier of the first mobile terminal indicates a reason why the first mobile terminal is disconnected from the first control terminal. For example, the lost-of-contact reason identifier of the first mobile terminal is 00, which indicates that the first mobile terminal is disconnected from the first control terminal as a distance between the first mobile terminal and the first control terminal is greater than a distance threshold value. The lost-of-contact reason identifier of the first mobile terminal is 01, which indicates that the first mobile terminal is disconnected from the first control terminal as the first mobile terminal has a power failure. The lost-of-contact reason identifier of the first mobile terminal is 02, which indicates that the first mobile terminal is disconnected from the first control terminal as the module is damaged.

Optionally, the first lost-of-contact distress signal further includes the channel information of the first channel. In addition, the first lost-of-contact distress signal may further include other information, which is not limited in the embodiments of the present disclosure.

In some embodiments, data supported by the first mobile terminal is data in a payload format, data supported by the server is data in a Json format, and the formats of the data supported by the first mobile terminal and the server are different. Therefore, in the case that the first mobile terminal sends the first lost-of-contact distress signal to the server, data format needs to be converted through an internet of things (IoT), and a communication protocol between the IoT device and the first mobile terminal is constrained application protocols (CoAP). That is, the first mobile terminal assembles the first lost-of-contact distress signal carrying the data in the payload format to acquire a CoAP message, and sends the CoAP message to the IoT device. Upon receiving the CoAP message from the first mobile terminal, the IoT device parses the CoAP message to acquire the data in the payload format, and performs a format conversion on the data in the payload format to acquire data in the Json format. The IoT device sends a data reporting notice to the server, wherein the data reporting notice carries the data in the Json format to send the first lost-of-contact distress signal to the server.

Optionally, upon receiving the data reporting notice, the server further sends an answer response to the first mobile terminal. That is, the server sends an answer response carrying data in the Json format to the IoT device. Upon receiving the answer response from the server, the IoT device performs the format conversion on the data in the Json format carried in the answer response to acquire the data in the payload format. The IoT device sends a CoAP answer response to the first mobile terminal, wherein the CoAP answer response carries the data in the payload format, and the CoAP answer response indicates that the server has received the first lost-of-contact distress signal from the first mobile terminal.

Figure 9:
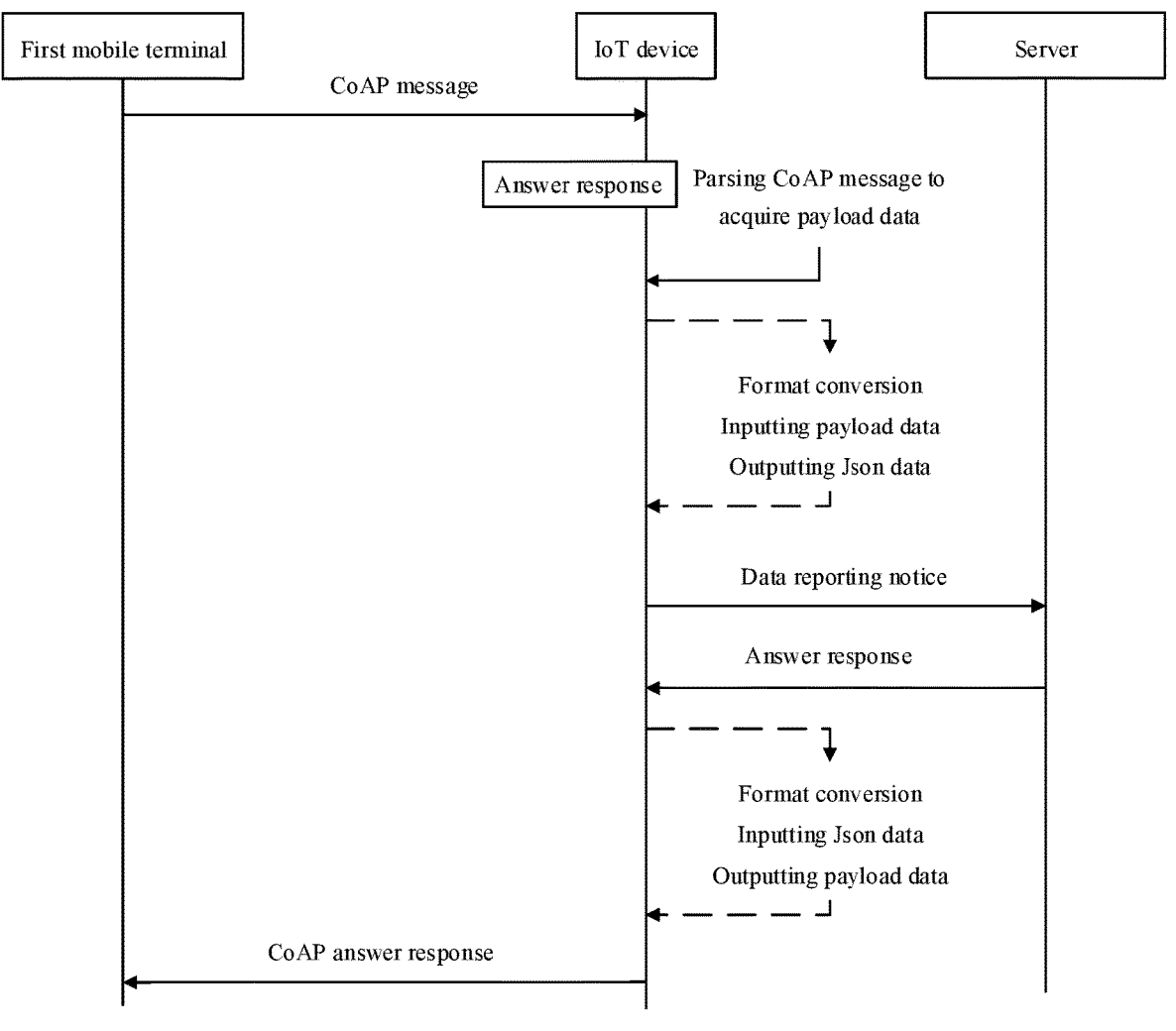
FIG. 9 is a schematic diagram of a first mobile terminal sending a first lost-of-contact distress signal to a server according to embodiments of the present disclosure.

Exemplarily, referring to FIG. 9, FIG. 9 is a schematic diagram of a first mobile terminal sending a first lost-of-contact distress signal to a server according to embodiments of the present disclosure. In FIG. 9, the first mobile terminal assembles a first lost-of-contact distress signal carrying data in a payload format to acquire a CoAP message, and sends the CoAP message to an IoT device. Upon receiving the CoAP message from the first mobile terminal, the IoT device parses the CoAP message to acquire the data in the payload format, and performs the format conversion on the data in the payload format to acquire data in a Json format. The IoT device sends a data reporting notice to the server, wherein the data reporting notice carries the data in the Json format to send the first lost-of-contact distress signal to the server.

Upon receiving the data reporting notice, the server sends an answer response carrying the data in the Json format to the IoT device. Upon receiving the answer response from the server, the IoT device performs the format conversion on the data in the Json format carried in the answer response to acquire the data in the payload format, and sends the CoAP answer response to the first mobile terminal, wherein the CoAP answer response carries the data in the payload format.

In step 802, the server receives the first lost-of-contact distress signal from the first mobile terminal, and broadcasts a first help-retrieving request based on the first lost-of-contact distress signal.

In some embodiments, the server broadcasts the first lost-of-contact distress signal, or sends the first lost-of-contact distress signal to the first control terminal, wherein the first lost-of-contact distress signal is configured to determine whether the first control terminal chooses to retrieve the first mobile terminal by itself or request other control terminals to help retrieve the first mobile terminal. The first control terminal receives the first lost-of-contact distress signal from the server, and in the case that the first control terminal determines to request other control terminals to help retrieve the first mobile terminal, the first help-retrieving request is sent to the server. The server receives and broadcasts the first help-retrieving request from the first control terminal.

Upon the server receiving the first lost-of-contact distress signal from the first mobile terminal, it indicates that the first mobile terminal is disconnected currently, and in this case, the server broadcasts the first lost-of-contact distress signal, such that the first control terminal receives the first lost-of-contact distress signal, and other control terminals know that the first mobile terminal is disconnected currently by receiving the first lost-of-contact distress signal broadcast by the server. In this way, other control terminals, which subsequently receive the first help-retrieving request broadcast by the server, help retrieve the first mobile terminal. In addition, the server may further directly send the first lost-of-contact distress signal to the first control terminal, such that the first control terminal knows that the first mobile terminal is disconnected currently, and other control terminals do not need to know that the first mobile terminal is disconnected. In this way, in the case that the first control terminal chooses to request other control terminals to help retrieve the first mobile terminal, upon the first control terminal sending the first help-retrieving request to the server, the server receives and broadcasts the first help-retrieving request from the first control terminal, such that other control terminals know that the first mobile terminal is disconnected currently by receiving the first help-retrieving request broadcast by the server, and the first control terminal requests other control terminals to help retrieve the first mobile terminal.

Upon receiving the first lost-of-contact distress signal from the first mobile terminal forwarded by the server, the first control terminal displays a help seeking interface, wherein the help seeking interface is configured to determine whether the first control terminal chooses to retrieve the first mobile terminal by itself or request other control terminals to help retrieve the first mobile terminal, and in response to a help-retrieving instruction, sends a first help-retrieving request to the server, wherein the first help-retrieving request is configured to request other control terminals to help retrieve the first mobile terminal. That is, upon receiving the first lost-of-contact distress signal from the server, the first control terminal displays the help seeking interface, and the user chooses to request other control terminals to help retrieve the first mobile terminal, in the case that the first control terminal detects a help-retrieving operation of the user, the first control terminal sends the first help-retrieving request to the server.

The first help-retrieving request at least includes first authorization information, channel information of a first channel, and current positioning information of the first control terminal, wherein the first authorization information is information of the first mobile terminal authorizing the first control terminal to control the first mobile terminal.

In some embodiments, the data supported by the control terminal is the data in the payload format, the data supported by the server is the data in the Json format, and the formats of the data supported by the control terminal and the server are different. Therefore, in the case that the server broadcasts the first lost-of-contact distress signal, the data format needs to be converted through the IoT device. That is, the server sends the first lost-of-contact distress signal carrying the data in the Json format to the IoT device, and upon receiving the first lost-of-contact distress signal from the server, the IoT device performs the format conversion on the data in the Json format carried by the first lost-of-contact distress signal to acquire the data in the payload format. The IoT device assembles the data in the payload format to acquire the CoAP message and issues the CoAP message to a plurality of control terminals, wherein the plurality of control terminals include the first control terminal.

Optionally, upon receiving the CoAP message, the plurality of control terminals may further answer a response to the server. That is, the plurality of control terminals send the CoAP answer responses carrying the data in the payload format to the IoT device. Upon receiving the CoAP answer responses from the plurality of control terminals, the IoT device performs the format conversion on the data in the payload format carried in the CoAP answer responses to acquire the data in the Json format. The IoT device sends a data reporting notice to the server, wherein the data reporting notice carries the data in the Json format, and the data reporting notice indicates that the plurality of control terminals have received the first lost-of-contact distress signal broadcast by the server.

Figure 10:
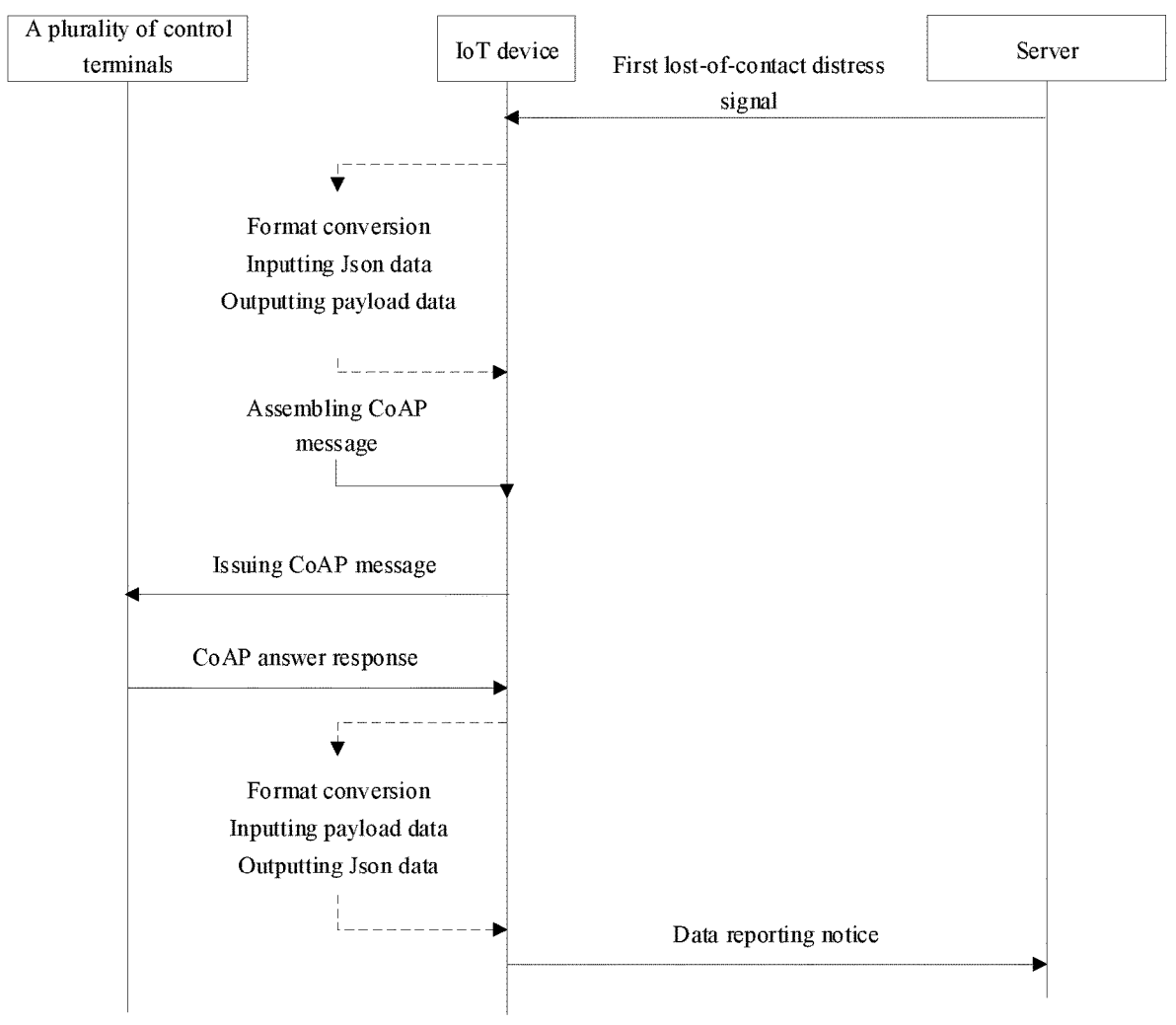
FIG. 10 is a schematic diagram of a server broadcasting a first lost-of-contact distress signal according to embodiments of the present disclosure.

Exemplarily, referring to FIG. 10, FIG. 10 is a schematic diagram of a server broadcasting a first lost-of-contact distress signal according to embodiments of the present disclosure. In FIG. 10, the server sends the first lost-of-contact distress signal carrying the data in the Json format to the IoT device, and upon receiving the first lost-of-contact distress signal from the server, the IoT device performs the format conversion on the data in the Json format carried by the first lost-of-contact distress signal to acquire the data in the payload format. The IoT device assembles the data in the payload format to acquire the CoAP message and issues the CoAP message to the plurality of control terminals.

Upon receiving the CoAP message, the plurality of control terminals send the CoAP answer responses carrying the data in the payload format to the IoT device. Upon receiving the CoAP answer responses from the plurality of control terminals, the IoT device performs the format conversion on the data in the payload format carried in the CoAP answer responses to acquire the data in the Json format. The IoT device sends a data reporting notice to the server, wherein the data reporting notice carries the data in the Json format.

Based on the above description, the formats of the data supported by the first control terminal and the server are different. Therefore, in the case that the first control terminal sends the first help-retrieving request to the server, the data format needs to be converted through the IoT device. A process of the first control terminal sending the first help-retrieving request to the server is similar to a process of the first mobile terminal sending the first lost-of-contact distress signal to the server in step 801, such that related contents in step 801 are referred to, and details are not described herein.

Based on the above description, the formats of the data supported by the control terminal and the server are different. Therefore, in the case that the server broadcasts the first help-retrieving request, the data format needs to be converted through the IoT device. A process of the server broadcasting the first help-retrieving request is similar to a process of the server broadcasting the first lost-of-contact distress signal in step 802, such that related contents in step 802 are referred to, and details are not described herein.

The above method is that upon receiving the first lost-of-contact distress signal, the first control terminal generates the first help-retrieving request and sends the first help-retrieving request to the server, and then the server broadcasts the first help-retrieving request. In addition, in other embodiments, upon receiving the first lost-of-contact distress signal from the first mobile terminal, the server generates the first help-retrieving request, such that the first help-retrieving request is broadcast to request other control terminals to help retrieve the first mobile terminal. That is, upon receiving the first lost-of-contact distress signal from the first mobile terminal, the server directly requests other control terminals to help retrieve the first mobile terminal, without inquiring the first control terminal to choose to retrieve the first mobile terminal by itself or request other control terminals to help retrieve the first mobile terminal.

Based on the above description, the first help-retrieving request at least includes the first authorization information, the channel information of the first channel, and the current positioning information of the first control terminal, such that upon the server receiving the first lost-of-contact distress signal from the first mobile terminal, the server acquires the first authorization information, the channel information of the first channel, and the current positioning information of the first control terminal. Then, the first help-retrieving request is generated and broadcast based on the first authorization information, the channel information of the first channel, and the current positioning information of the first control terminal.

Upon receiving the first lost-of-contact distress signal from the first mobile terminal, the server sends a first query request to the first mobile terminal. Upon receiving the first query request from the server, the first mobile terminal acquires the locally stored first authorization information and channel information of the first channel and sends them to the server. In this way, the server acquires the first authorization information and the channel information of the first channel.

Based on the above description, the first lost-of-contact distress signal at least includes the identity identifier of the first mobile terminal, the identity identifier of the first control terminal, and the current positioning information of the first mobile terminal. Therefore, upon receiving the first lost-of-contact distress signal, the server acquires corresponding current positioning information from correspondence between the stored identity identifiers and the current positioning information based on the identity identifier of the first control terminal included in the first lost-of-contact distress signal, and determines the acquired current positioning information as the current positioning information of the first control terminal. That is, each control terminal reports its real-time positioning information to the server, and the server stores the information in the above correspondence. In this way, upon the server receiving the first lost-of-contact distress signal from the first mobile terminal, the current positioning information of the first control terminal is acquired from the above correspondence based on the identity identifier of the first control terminal.

In the above method, the first control terminal chooses to request other control terminals to help retrieve the first mobile terminal, and in addition, in practice, the first control terminal may further choose to retrieve the first mobile terminal by itself. That is, the user chooses to retrieve the first mobile terminal by itself, and in the case that a self-retrieval operation of the user is detected by the first control terminal, a self-retrieval interface is displayed, wherein the self-retrieval interface includes the current positioning information of the first mobile terminal and the lost-of-contact reason identifier of the first mobile terminal. The first control terminal retrieves the first mobile terminal through different modes based on different lost-of-contact reason identifiers.

For example, the lost-of-contact reason identifier of the first mobile terminal is 00, which indicates that the first mobile terminal is disconnected from the first control terminal as a distance between the first mobile terminal and the first control terminal is greater than a distance threshold value. In this case, the first control terminal move a certain distance based on the current positioning information of the first mobile terminal, such that the distance between the first mobile terminal and the first control terminal is smaller than the distance threshold value. In this way, the first control terminal sends the control signal to the first mobile terminal via the first channel again, and controls the first mobile terminal to move to the current location of the first control terminal. The lost-of-contact reason identifier of the first mobile terminal is 01, which indicates that the first mobile terminal is disconnected from the first control terminal as the first mobile terminal has a power failure. In this case, the user manually retrieves the first mobile terminal based on the current positioning information of the first mobile terminal.

In step 803, the second control terminal receives the first help-retrieving request broadcast by the server, and sends a first confirmation help message to the server, wherein the first confirmation help message indicates that the second control terminal agrees to help retrieve the first mobile terminal.

The second control terminal receives the first help-retrieving request broadcast by the server, displays a request help interface, wherein the request help interface is configured to determine whether the second control terminal agrees to help retrieve the first mobile terminal, and sends, in response to a confirmation help instruction, the first confirmation help message to the server. That is, in the case that the second control terminal does not agree to help retrieve the first mobile terminal and the second control terminal detects a help canceling operation of the user, a first help canceling message is sent to the server. In the case that the second control terminal agrees to help retrieve the first mobile terminal and the second control terminal detects the confirmation help operation of the user, the second control terminal sends the first confirmation help message to the server.

The first confirmation help message at least includes a help identifier and an identity identifier of the second control terminal, wherein the help identifier indicates that the second control terminal agrees to help retrieve the first mobile terminal.

Figure 11:
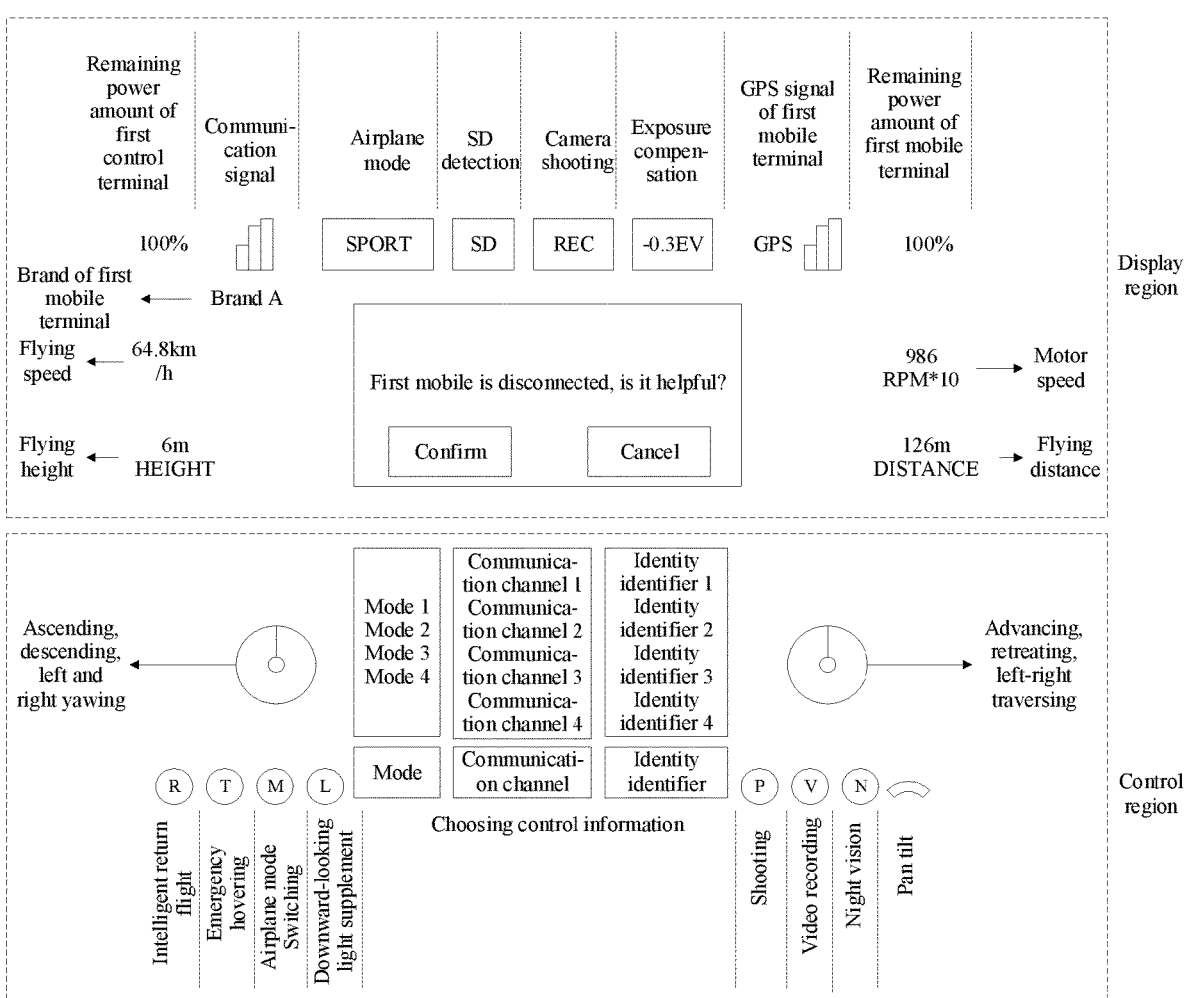
FIG. 11 is a schematic diagram of still another interface for controlling an unmanned aerial vehicle according to embodiments of the present disclosure.

Exemplarily, referring to FIG. 11, FIG. 11 is a schematic diagram of still another interface for controlling an unmanned aerial vehicle according to embodiments of the present disclosure. In FIG. 11, the second control terminal displays video data in a whole interface, and the whole interface is further divided into a control region and a display region, wherein the control region displays the control signal, and the display region displays the sensor data and the request help interface. A prompt message displayed by the request help interface is that "First mobile is disconnected, is it helpful?" In the case that the second control terminal detects a help canceling operation of the user, a first help canceling message is sent to the server, and in the case that the second control terminal detects a confirmation help operation of the user, a first confirmation help message is sent to the server.

Based on the above description, the formats of the data supported by the second control terminal and the server are different. Therefore, in the case that the second control terminal sends the first confirmation help message to the server, the data format needs to be converted through the IoT device. A process of the second control terminal sending the first confirmation help message to the server is similar to a process of the first mobile terminal sending the first lost-of-contact distress signal to the server in step 801, such that related contents in step 801 are referred to, and details are not described herein.

In step 804, the server receives a first confirmation help message from the second control terminal, and sends the first confirmation help message to the first control terminal.

Upon the server receiving the first confirmation help message from the second control terminal, it indicates that the second control terminal agrees to help retrieve the first mobile terminal. In this case, the server stops broadcasting the first help-retrieving request, and sends the first confirmation help message to the first control terminal.

Based on the above description, the formats of the data supported by the control terminal and the server are different. Therefore, in the case that the server sends the first confirmation help message to the first control terminal, the data format needs to be converted through the IoT device. A process of the server sending the first confirmation help message to the first control terminal is similar to a process of the server broadcasting the first lost-of-contact distress signal in step 802, such that related contents in step 802 are referred to, and details are not described herein.

In step 805, the second control terminal controls the first mobile terminal to move to the current position of the first control terminal.

Upon sending the first confirmation help message to the server, the second control terminal sends a control request to the first mobile terminal, wherein the control request includes an identity identifier of the second control terminal, a control mode expected by the second control terminal, first authorization information, channel information of the first channel, and an identity identifier of the first mobile terminal. Upon the first mobile terminal receiving the control request from the second control terminal, the first authorization information included in the control request is verified. In the case that the first authorization information is successfully verified, the first mobile terminal sends a control success response to the second control terminal. Upon receiving the control success response from the first mobile terminal, the second control terminal sends the control signal to the first mobile terminal via the first channel, such that the first mobile terminal is controlled to move from the current position of the first mobile terminal to the current position of the first control terminal, and the first mobile terminal is helped to be retrieved.

Figure 12:
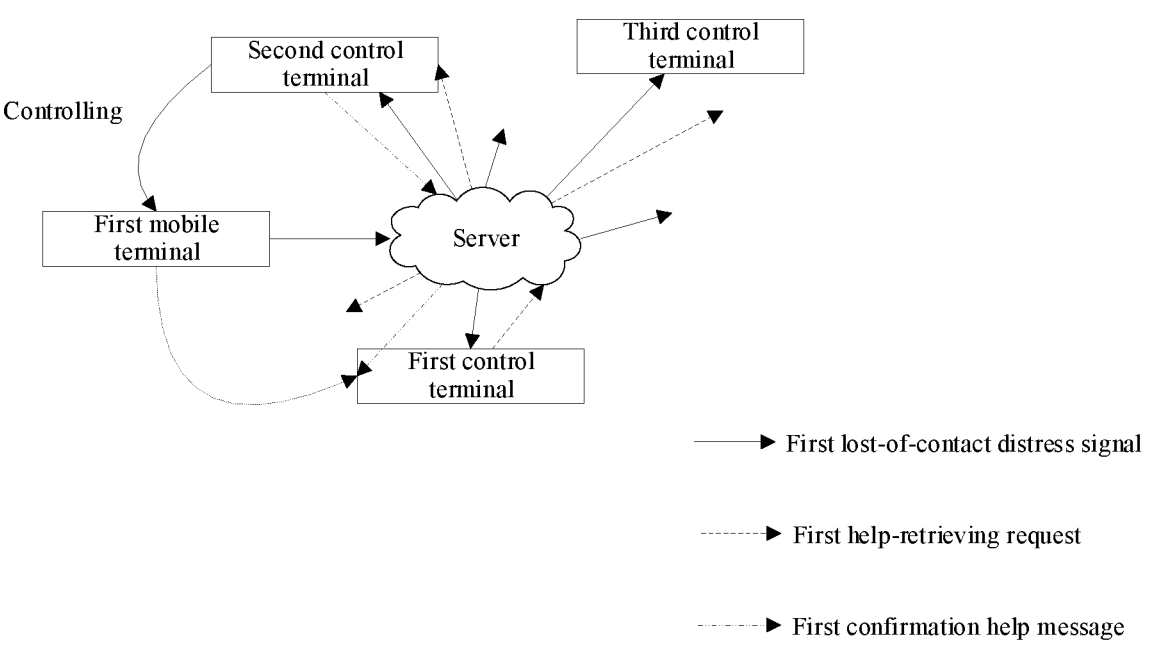
FIG. 12 is a schematic diagram of a process for retrieving a first lost-of-contact mobile terminal according to embodiments of the present disclosure.

Exemplarily, referring to FIG. 12, FIG. 12 is a schematic diagram of a method for retrieving a first lost-of-contact mobile terminal according to embodiments of the present disclosure. In FIG. 12, upon a first mobile terminal being disconnected from a first control terminal, the first mobile terminal sends a first lost-of-contact distress signal to a server, and the server receives and broadcasts the first lost-of-contact distress signal. Upon receiving the first lost-of-contact distress signal broadcast by the server, the first control terminal chooses to request other control terminals to help retrieve the first mobile terminal, and sends the first help-retrieving request to the server. The server receives and broadcasts the first help-retrieving request, and upon the second control terminal receiving the first help-retrieving request broadcast by the server, the second control terminal agrees to retrieve the first mobile terminal and sends a first confirmation help message to the server. Upon receiving the first confirmation help message from the second control terminal, the server sends a first confirmation help message to the first control terminal. Upon sending the first confirmation help message to the server, the second control terminal controls the first mobile terminal to move to the current position of the first control terminal, and finishes the retrieving the first lost-of-contact mobile terminal at this time.

In some embodiments, the second control terminal also interacts with the second mobile terminal by means of radio communication. That is, the second control terminal controls the second mobile terminal to receive and display the image-transmitting data from the second mobile terminal. In a process of communicating between the second control terminal and the second mobile terminal, the second mobile terminal may be disconnected from the second control terminal due to power failure, unstable signal, and explosion. Upon the second mobile terminal being disconnected from the second control terminal, the second mobile terminal sends a second lost-of-contact distress signal to the server, and the server receives and broadcasts the second lost-of-contact distress signal. Upon receiving the second lost-of-contact distress signal, the second control terminal also requests other control terminals to help retrieve the second mobile terminal. That is, the second control terminal sends a second help-retrieving request to the server, wherein the second help-retrieving request indicates that a second control terminal requests to help retrieve a disconnected second mobile terminal. The server receives and broadcasts the second help-retrieving request, and the first control terminal helps retrieve the second mobile terminal upon receiving the second help-retrieving request broadcast by the server.

An implementation process of the first control terminal helping retrieve the second mobile terminal includes: receiving, by the first control terminal, the second help-retrieving request broadcast by the server; displaying the request help interface, wherein the request help interface is configured to determine whether the first control terminal agrees to help retrieve the second mobile terminal; sending, in response to the confirmation help instruction, the second confirmation help message to the server, wherein the second confirmation help message indicates that the first control terminal agrees to help retrieve the second mobile terminal; and controlling the second mobile terminal to move to the current position of the second control terminal. For the detailed implementation process, reference is made to relevant contents of the above steps, which are not described herein again.

In the case that the first mobile terminal is disconnected from the first control terminal, the first mobile terminal sends the first lost-of-contact distress signal to the server through the IoT device, and the server receives and broadcasts the first lost-of-contact distress signal. Upon receiving the first lost-of-contact distress signal, the first control terminal retrieves the first mobile terminal, instead of retrieving the first mobile terminal through the intelligent return of the first mobile terminal. In this case, a situation that the first mobile terminal is not successfully retrieved due to an accidental touch of the user is avoided. Moreover, the current positioning information of the first mobile terminal included in the first lost-of-contact distress signal is determined by a GPS module of the first mobile terminal. That is, the current positioning information of the first mobile terminal is not interfered by the environment and is not changed, such that the first control terminal successfully retrieves the first mobile terminal based on the current positioning information of the first mobile terminal under any condition.

Figure 13:
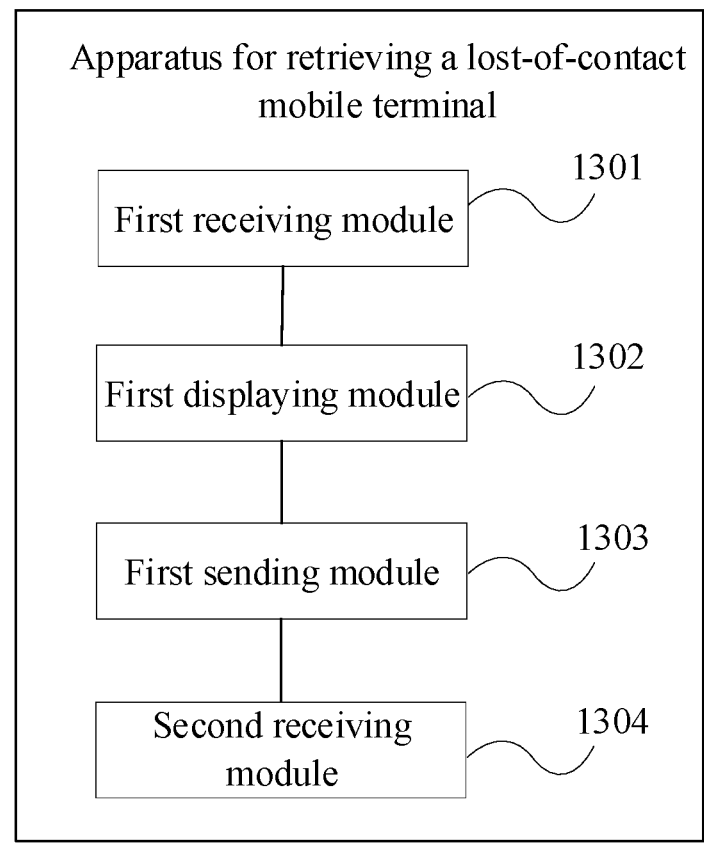
FIG. 13 is a schematic structural diagram of an apparatus for retrieving a lost-of-contact mobile terminal according to embodiments of the present disclosure.

FIG. 13 is a schematic structural diagram of an apparatus for retrieving a lost-of-contact mobile terminal according to embodiments of the present disclosure, wherein the apparatus for retrieving the lost-of-contact mobile terminal is performed as part or all of control terminals by software, hardware, or a combination of the software and the hardware. Referring to FIG. 13, the apparatus includes: a first receiving module 1301, a first displaying module 1302, a first sending module 1303, and a second receiving module 1304.

The first receiving module 1301 is configured to receive a first lost-of-contact distress signal from a first mobile terminal forwarded by a server, wherein the first lost-of-contact distress signal indicates that the first mobile terminal is disconnected from the first control terminal. For the detailed implementation process, reference is made to corresponding contents in the above embodiments, which is not described herein again.

The first displaying module 1302 is configured to display a help seeking interface, wherein the help seeking interface is configured to determine whether the first control terminal chooses to retrieve the first mobile terminal by itself or request other control terminals to help retrieve the first mobile terminal. For the detailed implementation process, reference is made to corresponding contents in the above embodiments, which is not described herein again.

The first sending module 1303 is configured to send, in response to a help-retrieving instruction, a first help-retrieving request to the server. For the detailed implementation process, reference is made to corresponding contents in the above embodiments, which is not described herein again.

The second receiving module 1304 is configured to receive a first confirmation help message from a second control terminal from the server, wherein the first confirmation help message indicates that the second control terminal agrees to help retrieve the first mobile terminal. For the detailed implementation process, reference is made to corresponding contents in the above embodiments, which is not described herein again.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

Optionally, the apparatus further includes:

a third receiving module, configured to receive a second help-retrieving request from the server, wherein the second help-retrieving request indicates that a second control terminal requests to help retrieve a disconnected second mobile terminal;

a second displaying module, configured to display a request help interface, wherein the request help interface is configured to determine whether the first control terminal agrees to help retrieve the second mobile terminal;

a second sending module, configured to send, in response to a confirmation help instruction, a second confirmation help message to the server, wherein the second confirmation help message indicates that the first control terminal agrees to help retrieve the second mobile terminal; and a controlling module, configured to control the second mobile terminal to move to a current position of the second control terminal.

Optionally, the first control terminal interacts with the first mobile terminal by means of radio communication, and the apparatus further includes:

a third sending module, configured to send a control signal to the first mobile terminal via a first channel to control the first mobile terminal, wherein the first channel is a communication channel between the first mobile terminal and the first control terminal;

a fourth receiving module, configured to receive image-transmitting data from the first mobile terminal via the first channel, wherein the image-transmitting data includes video data and sensor data, the video data being data acquired by a first person main view FPV camera on the first mobile terminal, and the sensor data being data acquired by a sensor on the first mobile terminal; and a third displaying module, configured to display the video data and the sensor data.

Optionally, the apparatus further includes:

a fifth receiving module, configured to receive a pairing message broadcast by the first mobile terminal, wherein the pairing message includes the identity identifier of the first mobile terminal and channel information of the first channel;

a fourth displaying module, configured to display a pairing interface, wherein the pairing interface includes the identity identifier of the first mobile terminal and the channel information of the first channel;

a fourth sending module, configured to send, in response to a pairing instruction, a pairing request to the first mobile terminal, wherein the pairing request includes an identity identifier of the first control terminal, a control mode expected by the first control terminal, the channel information of the first channel, and the identity identifier of the first mobile terminal; and a sixth receiving module, configured to receive a pairing success response from the first mobile terminal, wherein the pairing success response indicates that the first mobile terminal has authorized the first control terminal to use the control mode for control.

Figure 14:
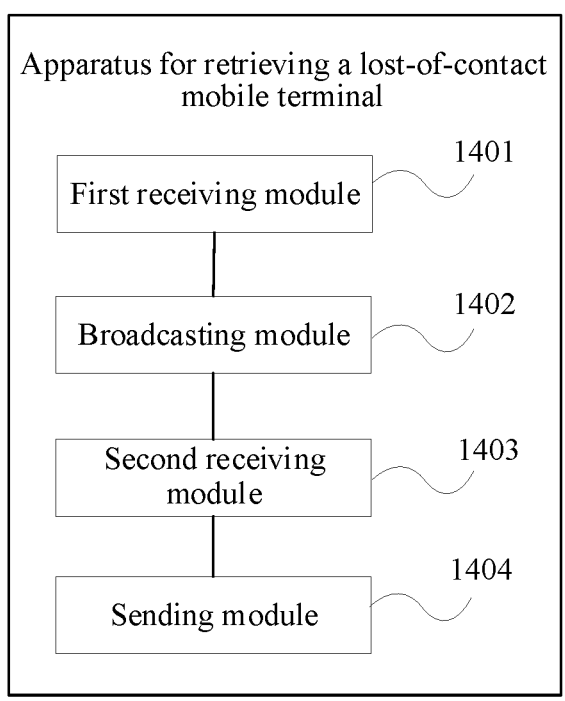
FIG. 14 is a schematic structural diagram of another apparatus for retrieving a lost-of-contact mobile terminal according to embodiments of the present disclosure.

FIG. 14 is a schematic structural diagram of another apparatus for retrieving a lost-of-contact mobile terminal according to embodiments of the present disclosure, wherein the apparatus for retrieving the lost-of-contact mobile terminal is performed as part or all of the servers by software, hardware, or a combination of the software and the hardware. Referring to FIG. 14, the apparatus includes: a first receiving module 1401, a broadcasting module 1402, a second receiving module 1403, and a sending module 1404.

The first receiving module 1401 is configured to receive a first lost-of-contact distress signal from a first mobile terminal, wherein the first lost-of-contact distress signal indicates that the first mobile terminal is disconnected from a first control terminal. For the detailed implementation process, reference is made to corresponding contents in the above embodiments, which is not described herein again.

The broadcasting module 1402 is configured to broadcast a first help-retrieving request based on the first lost-of-contact distress signal, wherein the first help-retrieving request is configured to request other control terminals to help retrieve the first mobile terminal. For the detailed implementation process, reference is made to corresponding contents in the above embodiments, which is not described herein again.

The second receiving module 1403 is configured to receive a first confirmation help message from a second control terminal, wherein the first confirmation help message indicates that the second control terminal agrees to help retrieve the first mobile terminal. For the detailed implementation process, reference is made to corresponding contents in the above embodiments, which is not described herein again.

The sending module 1404 is configured to send the first confirmation help message to the first control terminal. For the detailed implementation process, reference is made to corresponding contents in the above embodiments, which is not described herein again.

Optionally, the broadcasting module 1402 is specifically configured to:

broadcast the first lost-of-contact distress signal, or send the first lost-of-contact distress signal to the first control terminal, wherein the first lost-of-contact distress signal is configured to determine whether the first control terminal chooses to retrieve the first mobile terminal by itself or request other control terminals to help retrieve the first mobile terminal; and receive and broadcast the first help-retrieving request from the first control terminal.

Optionally, the first lost-of-contact distress signal at least includes an identity identifier of the first mobile terminal, an identity identifier of the first control terminal, and current positioning information of the first mobile terminal; and the first help-retrieving request at least includes first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

In the case that the first mobile terminal is disconnected from the first control terminal, the first mobile terminal sends the first lost-of-contact distress signal to the server through the IoT device, and the server receives and broadcasts the first lost-of-contact distress signal. Upon receiving the first lost-of-contact distress signal, the first control terminal retrieves the first mobile terminal, instead of retrieving the first mobile terminal through the intelligent return of the first mobile terminal. In this case, a situation that the first mobile terminal is not successfully retrieved due to an accidental touch of the user is avoided. Moreover, the current positioning information of the first mobile terminal included in the first lost-of-contact distress signal is determined by a GPS module of the first mobile terminal. That is, the current positioning information of the first mobile terminal is not interfered by the environment and is not changed, such that the first control terminal successfully retrieves the first mobile terminal based on the current positioning information of the first mobile terminal under any condition. In addition, as the first control terminal interacts with the first mobile terminal by means of radio communication manner, in the case that the first control terminal communicates with the first mobile terminal through the first channel, the first control terminal sends the control signal to the first mobile terminal through the first channel and receives the image-transmitting data from the first mobile terminal through the first channel. Therefore, after the first control terminal displays the image-transmitting data, the user controls the first mobile terminal to execute the corresponding action through the image-transmitting data displayed by the first control terminal. Moreover, the image-transmitting data from the first mobile terminal includes the video data and the sensor data. That is, the first mobile terminal simultaneously sends the video data and the sensor data to the first control terminal, and the sensor data is not sent to the controller first and then sent to the display by the controller, such that a time difference of intermediate transmission of the sensor data is eliminated, and the user conveniently knows a state of the mobile terminal in real-time.

It should be noted that in the case that the apparatus for retrieving the lost-of-contact mobile terminal according to the above embodiments is retrieving a lost-of-contact mobile terminal, division of various function modules is merely exemplary. In practice, the above functions are assigned to different functional modules as needed, that is, an internal structure of the apparatus is divided into different function modules, such that all or a part of the above functions are completed. In addition, the apparatus for retrieving the lost-of-contact mobile terminal according to the above embodiments belongs to the same concept as the method for retrieving the lost-of-contact mobile terminal according to the embodiments, and specific implementation processes thereof are described in the method embodiments in detail, which is not repeated herein.

Figure 15:
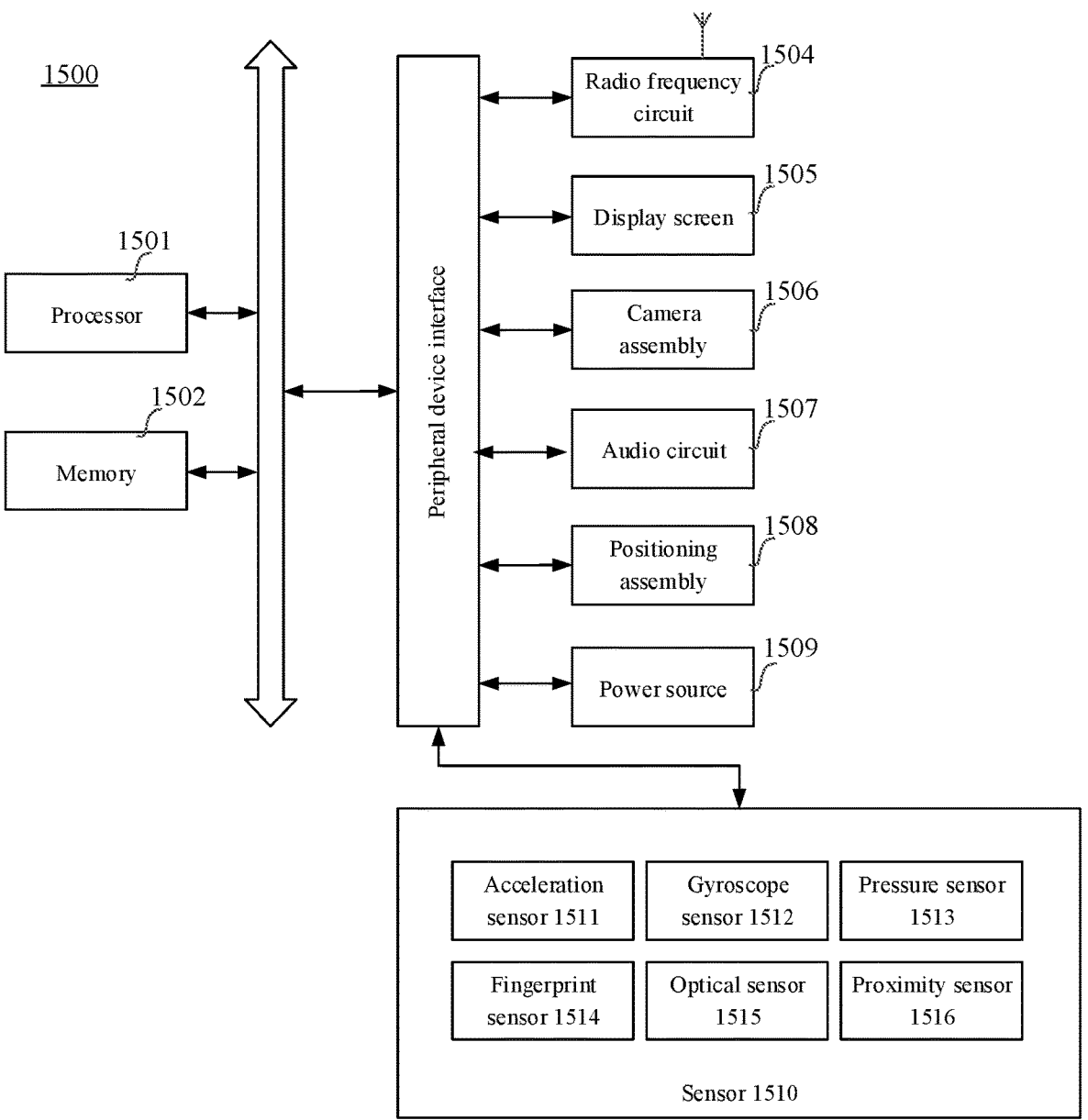
FIG. 15 is a schematic structural diagram of a terminal according to embodiments of the present disclosure.

FIG. 15 is a block diagram of a control terminal 1500 according to embodiments of the present disclosure. The control terminal 1500 is a portable mobile terminal, such as a smart phone, a tablet computer, a moving picture experts group audio layer III (MP3) player, a moving picture experts group audio layer IV (MP4) player, a laptop, or a desktop computer. The control terminal 1500 is also referred to by other names of a user equipment, a portable terminal, a laptop terminal, a desktop terminal, or the like.

Usually, the control terminal 1500 includes a processor 1501 and a memory 1502.

The processor 1501 includes one or more processing cores, such as a four-core processor and an eight-core processor. The processor 1501 is implemented by at least one of hardware forms of a digital signal processor (DSP), a field-programmable gate array (FPGA), and a programmable gate array (PLA). The processor 1501 also includes a main processor and a coprocessor. The main processor is a processor for processing data in an awake state and is also referred to as a central processing unit (CPU). The coprocessor is a low-power-consumption processor for processing data in a standby state. In some embodiments, the processor 1501 is integrated with a graphics processing unit (GPU), which is configured to render and draw content that needs to be displayed on a display screen. In some embodiments, the processor 1501 further includes an artificial intelligence (AI) processor configured to process computational operations related to machine learning.

The memory 1502 includes one or more computer-readable storage media, which are non-transitory. The memory 1502 further includes a high-speed random-access memory and a non-volatile memory, such as one or more magnetic disk storage devices and flash storage devices. In some embodiments, the non-transitory computer-readable storage medium in the memory 1502 is configured to store at least one instruction, which is configured to be executed by the processor 1501 to achieve the method for retrieving the lost-of-contact mobile terminal according to method embodiments in the present disclosure.

In some embodiments, the control terminal 1500 further optionally includes a peripheral device interface 1503 and at least one peripheral device. The processor 1501, the memory 1502, and the peripheral interface 1503 are connected by a bus or a signal line. Each peripheral device is connected to the peripheral interface 1503 via a bus, a signal line, or a circuit board. Specifically, the peripheral device includes at least one of a radio frequency circuit 1504, a display screen 1505, a camera assembly 1506, an audio circuit 1507, a positioning assembly 1508, and a power source 1509.

The peripheral device interface 1503 is configured to connect at least one peripheral device associated with input/output (I/O) to the processor 1501 and the memory 1502. In some embodiments, the processor 1501, the memory 1502, and the peripheral device interface 1503 are integrated on a same chip or circuit board. In some other embodiments, any one or two of the processor 1501, the memory 1502, and the peripheral device interface 1503 is or are implemented on a separate chip or circuit board, which is not limited in the present embodiment.

The radio frequency circuit 1504 is configured to receive and transmit a radio frequency (RF) signal, which is also referred to as an electromagnetic signal. The RF circuit 1504 communicates with a communication network and other communication devices via electromagnetic signals. The RF circuit 1504 converts an electrical signal into an electromagnetic signal for transmission, or converts a received electromagnetic signal into an electrical signal. Optionally, the RF circuit 1504 includes an antenna system, an RF transceiver, one or more amplifiers, a tuner, an oscillator, a digital signal processor, a codec chipset, a subscriber identity module card, and the like. The RF circuit 1504 communicates with other control terminals via at least one wireless communication protocol. The wireless communication protocol includes, but is not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 1504 may further include a near-field communication (NFC) related circuit, which is not limited in the embodiments of the present disclosure.

The display screen 1505 is configured to display a user interface (UI). The UI includes graphics, text, icons, videos, and any combination thereof. In the case that the display screen 1505 is a touch display screen, the display screen 1505 also can acquire a touch signal on or over a surface of the display screen 1505. The touch signal is input into the processor 1501 as a control signal for processing. In this case, the display screen 1505 is further configured to provide virtual buttons and/or a virtual keyboard, which are also referred to as soft buttons and/or a soft keyboard. In some embodiments, one display screen 1505 is disposed on a front panel of the control terminal 1500. In some other embodiments, at least two display screens 1505 are disposed on different surfaces of the control terminal 1500 respectively or in a folded design. In some still other embodiments, the display screen 1505 is a flexible display disposed on a bending or folded surface of the control terminal 1500. The display screen 1505 may have an irregular shape other than a rectangle, that is, a special-shaped screen. The display screen 1505 is prepared by using a material such as a liquid crystal display (LCD) or an organic light-emitting diode (OLED).

The camera assembly 1506 is configured to capture images or videos. Optionally, the camera assembly 1506 includes a front camera and a rear camera. Usually, the front camera is disposed on a front panel of the control terminal, and the rear camera is disposed on a back surface of the control terminal. In some embodiments, at least two rear cameras are disposed, and each of the at least two rear cameras is at least one of a main camera, a depth-of-field camera, a wide-angle camera, and a telephoto camera, to realize a background blurring function achieved by fusion of the main camera and the depth-of-field camera, panoramic shooting and virtual reality (VR) shooting functions by fusion of the main camera and the wide-angle camera, or other fusion shooting functions. In some embodiments, the camera assembly 1506 may also include a flashlight. The flashlight may be a mono-color temperature flashlight or a two-color temperature flashlight. The two-color temperature flashlight is a combination of a warm flashlight and a cold flashlight, and is used for light compensation at different color temperatures.

The audio circuit 1507 includes a microphone and a loudspeaker. The microphone is configured to acquire sound waves of users and the environments, and convert the sound waves into electrical signals which are input into the processor 1501 for processing, or into the radio frequency circuit 1504 for voice communication. For stereophonic sound acquisition or noise reduction, there are a plurality of microphones disposed at different portions of the control terminal 1500 respectively. The microphone is further an array microphone or an omnidirectional acquisition microphone. The loudspeaker is then configured to convert electrical signals from the processor 1501 or the radio frequency circuit 1504 into sound waves. The loudspeaker is a conventional film loudspeaker and a piezoelectric ceramic loudspeaker. In the case that the loudspeaker is a piezoelectric ceramic speaker, the electrical signal may be converted into not only human-audible sound waves but also the sound waves which are inaudible to humans for ranging and the like. In some embodiments, the audio circuit 1507 further includes a headphone jack.

The positioning assembly 1508 is configured to position a current geographic location of the control terminal 1500 to implement navigation or a location-based service (LBS). The positioning assembly 1508 may be the United States' Global Positioning System (GPS), China's BeiDou Navigation Satellite System (BDS), Russia's Global Navigation Satellite System (GLONASS), and the European Union's Galileo Satellite Navigation System (Galileo).

The power supply 1509 is configured to supply power for various components in the control terminal 1500. The power source 1509 is an alternating current, a direct current, a disposable battery, or a rechargeable battery. In the case that the power source 1509 includes a rechargeable battery, the rechargeable battery may be a wired rechargeable battery or a wireless rechargeable battery. The wired rechargeable battery is a battery charged by a wired line, and the wireless rechargeable battery is a battery charged by a wireless coil. The rechargeable battery is further configured to support fast charging.

In some embodiments, the control terminal 1500 further includes one or more sensors 1510. The one or more sensors 1510 include, but are not limited to, an acceleration sensor 1511, a gyroscope sensor 1512, a force sensor 1513, a fingerprint sensor 1514, an optical sensor 1515, and a proximity sensor 1516.

The acceleration sensor 1511 is configured to detect magnitude of acceleration on three coordinate axes of a coordinate system established by the control terminal 1500. For example, the acceleration sensor 1511 is configured to detect components of a gravitational acceleration on three coordinate axes. The processor 1501 control the display screen 1505 to display a user interface in a landscape view or a portrait view according to a gravity acceleration signal acquired by the acceleration sensor 1511. The acceleration sensor 1511 is further configured to acquire motion data of a game or a user.

The gyroscope sensor 1512 detects a body direction and a rotation angle of the control terminal 1500, and the gyroscope sensor 1512 may cooperate with the acceleration sensor 1511 to acquire a 3D motion of the user on the control terminal 1500. Based on the data acquired by the gyroscope sensor 1512, the processor 1501 achieves the following functions: motion sensing (such as changing the UI according to a user's tilting operation), image stabilization during shooting, game control, and inertial navigation.

The force sensor 1513 is disposed on a side frame of the control terminal 1500 and/or a lower layer of the display screen 1505. In the case that the force sensor 1513 is disposed on the side frame of the control terminal 1500, a holding signal of the user to the control terminal 1500 is detected, and the processor 1501 performs left-right hand recognition or quick operation according to the holding signal acquired by the force sensor 1513. In the case that the force sensor 1513 is disposed on the lower layer of the display screen 1505, the processor 1501 controls an operable control on the UI interface according to a user's pressure operation on the display screen 1505. The operability control includes at least one of a button control, a scroll bar control, an icon control, and a menu control.

The fingerprint sensor 1514 is configured to acquire a user's fingerprint, and the processor 1501 identifies the user's identity based on the fingerprint acquired by the fingerprint sensor 1514, or the fingerprint sensor 1514 identifies the user's identity based on the acquired fingerprint. In the case that the user's identity is identified as trusted, the processor 1501 authorizes the user to perform related sensitive operations, including unlocking the screen, viewing encrypted information, downloading software, paying, changing settings, and the like. The fingerprint sensor 1514 is disposed on the front, the back, or the side of the control terminal 1500. In the case that the control terminal 1500 is provided with a physical button or a manufacturer's logo, the fingerprint sensor 1514 is integrated with the physical key or the manufacturer's logo.

The optical sensor 1515 is configured to acquire ambient light intensity. In one embodiment, the processor 1501 controls the display brightness of the display screen 1505 based on the ambient light intensity acquired by the optical sensor 1515. Specifically, in the case that the ambient light intensity is relatively high, the display brightness of the display screen 1505 is increased; and in the case that the ambient light intensity is relatively low, the display brightness of the display screen 1505 is decreased. In another embodiment, the processor 1501 further dynamically adjusts shooting parameters of the camera assembly 1506 based on the ambient light intensity acquired by the optical sensor 1515.

The proximity sensor 1516, also referred to a distance sensor, is usually disposed on the front panel of the control terminal 1500. The proximity sensor 1516 is configured to acquire a distance between the user and a front surface of the control terminal 1500. In one embodiment, in the case that the proximity sensor 1516 detects that the distance between the user and the front side of the control terminal 1500 gradually decreases, the processor 1501 controls the display screen 1505 to switch from a screen-on state to a screen-off state; and in the case that the proximity sensor 1516 detects that the distance between the user and the front side of the control terminal 1500 gradually increases, the processor 1501 controls the display screen 1505 to switch from the screen-off state to the screen-on state.

Those skilled in the art understand that the structure illustrated in FIG. 15 does not constitute limitation of the control terminal 1500, and the computer device includes more or fewer components than those illustrated, or some of the components are combined, or different components are adopted to arrange.

Figure 16:
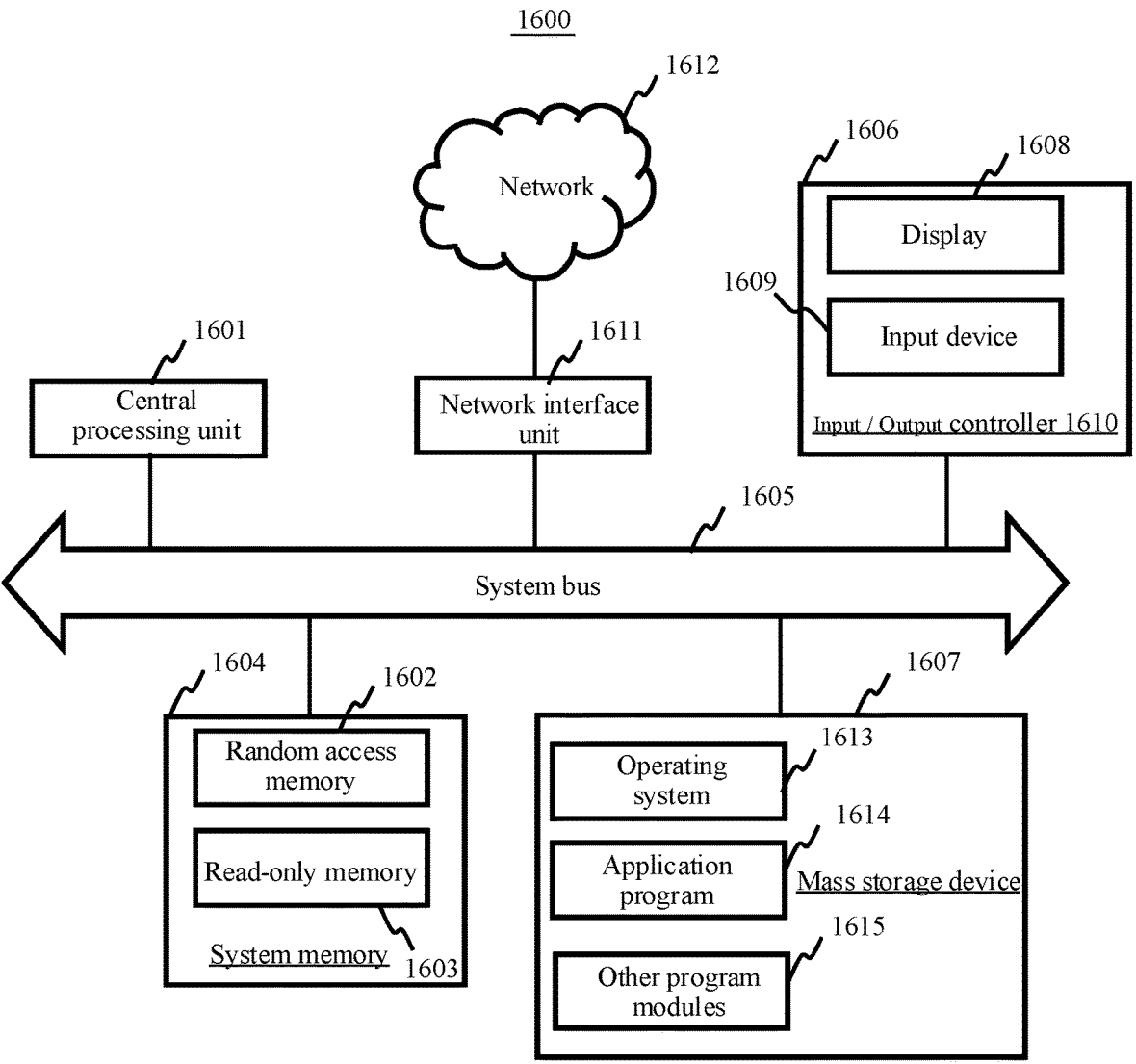
FIG. 16 is a structural schematic diagram of a server according to embodiments of the present disclosure.

FIG. 16 is a structural schematic diagram of a server according to the embodiments of the present disclosure. A server 1600 includes a central processing unit (CPU) 1601, a system memory 1604 including a random-access memory (RAM) 1602, and a read-only memory (ROM) 1603, and a system bus 1605 for connecting the system memory 1604 with the central processing unit 1601. The server 1600 further includes a basic input/output system (I/O system) 1606 configured to facilitate information transfer between components within the computer, and a mass storage device 1607 configured to store an operating system 1613, application programs 1614, and other program modules 1615.

The basic input/output system 1606 includes a display 1608 configured to display information and an input device 1609 configured to input information by a user, such as a mouse and a keyboard. The display 1608 and the input device 1609 are connected with the central processing unit 1601 by the input/output controller 1610 connected with the system bus 1605. The basic input/output system 1606 further includes an input/output controller 1610 configured to receive and process inputs from a plurality of other devices, such as a keyboard, a mouse, or an electronic stylus. Similarly, the input/output controller 1610 further provides output devices outputting onto a display screen and a printer, or other type of output devices.

The mass storage device 1607 is connected with the CPU 1601 through a mass storage controller (not shown) connected with the system bus 1605. The mass storage device 1607 and an associated computer-readable medium thereof provide non-volatile storage for the server 1600. That is, the mass storage device 1607 includes a computer-readable medium (not shown), such as a hard disk or CD-ROM drive.

Generally, the computer-readable medium includes a computer storage medium and a communication medium. The computer storage media includes a volatile and non-volatile, removable and non-removable medium achieved in any method or technology for storage of information such as computer readable instructions, data structures, program modules or other data. The computer storage media includes RAM, ROM, EPROM, EEPROM, flash memory, or other solid state storage technologies, CD-ROM, DVD, or other optical storage, magnetic cassettes, magnetic tape, magnetic disk storage or other magnetic storage devices. In addition, it is appreciated by those skilled in the art that the computer storage medium is not limited to the foregoing. The system memory 1604 and the mass storage device 1607 described above are collectively referred to as the memory.

According to various embodiments of the present disclosure, the server 1600 is further connected with a remote computer on a network through the network, such as the Internet, for running. That is, the server 1600 is connected with the network 1612 through a network interface unit 1611 connected with the system bus 1605, or is connected with other types of networks or remote computer systems (not shown) using the network interface unit 1611.

The above memory further includes one or more programs, which are stored in the memory and are configured to be executed by the CPU.

In some embodiments, a computer-readable storage medium is also provided, wherein the storage medium stores a computer program, when executed by a processor, causes the processor to perform the method in the above embodiments. For example, the computer-readable storage medium is a ROM, a RAM, a CD-ROM, a magnetic tape, a soft disk, an optical data storage device, and the like.

It should be noted that the computer-readable storage medium mentioned according to the embodiments of the present disclosure is a non-volatile storage medium, in other words, a non-transitory storage medium.

It should be understood that all or part of the steps to achieve the above embodiments are performed by software, hardware, firmware, or any combination thereof. In the case that it is achieved in software, it is performed in whole or in part in the form of a computer program product. The computer program product includes one or more computer instructions. The computer instructions are stored in the above computer-readable storage medium.

That is, in some embodiments, there is also provided a computer program product including instructions, wherein the instructions, when executed by a computer, causes the computer to perform steps of the above method.

It should be understood that the term "at least one" refers to one or more, and "a plurality of" refers to two or more. In the description of the embodiments of the present disclosure, "I" indicates an alternative meaning, for example, A/B indicates A or B; "and/or" herein is only an association relationship that describes the associated objects, and indicates that there are three relationships. For example, A and/or B may indicate that: only A is present, both A and B are present, and only B is present. In addition, in order to facilitate clear description of technical solutions of the embodiments of the present disclosure, in the embodiments of the present disclosure, words such as "first" and "second" are adopted to distinguish identical items or similar items with substantially identical functions and actions. Those skilled in the art are appreciated that the terms "first," "second," and the like do not limit quantity and execution order, but rather the terms "first," "second," and the like do not limit that they are not necessarily different.

Described above are the embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for retrieving a lost-of-contact mobile terminal, applied to a first control terminal, comprising:
   receiving a first lost-of-contact distress signal from a first mobile terminal forwarded by a server, wherein the first lost-of-contact distress signal indicates that the first mobile terminal is disconnected from the first control terminal, and the first lost-of-contact distress signal at least comprises an identity identifier of the first mobile terminal, an identity identifier of the first control terminal, and current positioning information of the first mobile terminal;
   displaying a help seeking interface, wherein the help seeking interface is configured to determine whether the first control terminal chooses to retrieve the first mobile terminal by itself or request other control terminals to help retrieve the first mobile terminal;
   sending, in response to a help-retrieving instruction, a first help-retrieving request to the server, wherein the first help-retrieving request at least comprises first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal; and
   receiving a first confirmation help message from a second control terminal from the server, wherein the first confirmation help message indicates that the second control terminal agrees to help retrieve the first mobile terminal.

2. The method according to claim 1, further comprising:
   receiving a second help-retrieving request from the server, wherein the second help-retrieving request indicates that a second control terminal requests to help retrieve a disconnected second mobile terminal;
   displaying a request help interface, wherein the request help interface is configured to determine whether the first control terminal agrees to help retrieve the second mobile terminal;
   sending, in response to a confirmation help instruction, a second confirmation help message to the server, wherein the second confirmation help message indicates that the first control terminal agrees to help retrieve the second mobile terminal; and
   controlling the second mobile terminal to move to a current position of the second control terminal.

3. The method according to claim 1, wherein the first control terminal interacts with the first mobile terminal by means of radio communication, and the method further comprises:
   sending a control signal to the first mobile terminal via a first channel to control the first mobile terminal, wherein the first channel is a communication channel between the first mobile terminal and the first control terminal;
   receiving image-transmitting data from the first mobile terminal via the first channel, wherein the image-transmitting data comprises video data and sensor data, the video data being data acquired by a first person main view FPV camera on the first mobile terminal, and the sensor data being data acquired by a sensor on the first mobile terminal; and
   displaying the video data and the sensor data.

4. The method according to claim 3, wherein prior to sending the control signal to the first mobile terminal via the first channel, the method further comprises:
   receiving a pairing message broadcast by the first mobile terminal, wherein the pairing message comprises an identity identifier of the first mobile terminal and channel information of the first channel;

displaying a pairing interface, wherein the pairing interface comprises the identity identifier of the first mobile terminal and the channel information of the first channel;

sending, in response to a pairing instruction, a pairing request to the first mobile terminal, wherein the pairing request comprises an identity identifier of the first control terminal, a control mode expected by the first control terminal, the channel information of the first channel, and the identity identifier of the first mobile terminal; and receiving a pairing success response from the first mobile terminal, wherein the pairing success response indicates that the first mobile terminal has authorized the first control terminal to use the control mode for control.

5. A computer device, comprising a memory and a processor, wherein the memory is configured to store a computer program, and the processor is configured to execute the computer program stored in the memory, to perform the method as defined in claim 1.

6. The computer device according to claim 5, wherein the method further comprises:

receiving a second help-retrieving request from the server, wherein the second help-retrieving request indicates that a second control terminal requests to help retrieve a disconnected second mobile terminal;

displaying a request help interface, wherein the request help interface is configured to determine whether the first control terminal agrees to help retrieve the second mobile terminal;

sending, in response to a confirmation help instruction, a second confirmation help message to the server, wherein the second confirmation help message indicates that the first control terminal agrees to help retrieve the second mobile terminal; and controlling the second mobile terminal to move to a current position of the second control terminal.

7. The computer device according to claim 5, wherein the first control terminal interacts with the first mobile terminal by means of radio communication, and the method further comprises:

sending a control signal to the first mobile terminal via a first channel to control the first mobile terminal, wherein the first channel is a communication channel between the first mobile terminal and the first control terminal;

receiving image-transmitting data from the first mobile terminal via the first channel, wherein the image-transmitting data comprises video data and sensor data, the video data being data acquired by a first person main view FPV camera on the first mobile terminal, and the sensor data being data acquired by a sensor on the first mobile terminal; and displaying the video data and the sensor data.

8. The computer device according to claim 7, wherein prior to sending the control signal to the first mobile terminal via the first channel, the method further comprises:

receiving a pairing message broadcast by the first mobile terminal, wherein the pairing message comprises an identity identifier of the first mobile terminal and channel information of the first channel;

displaying a pairing interface, wherein the pairing interface comprises the identity identifier of the first mobile terminal and the channel information of the first channel;

sending, in response to a pairing instruction, a pairing request to the first mobile terminal, wherein the pairing request comprises an identity identifier of the first control terminal, a control mode expected by the first control terminal, the channel information of the first channel, and the identity identifier of the first mobile terminal; and receiving a pairing success response from the first mobile terminal, wherein the pairing success response indicates that the first mobile terminal has authorized the first control terminal to use the control mode for control.

9. A non-transitory computer-readable storage medium storing a computer program, wherein the computer program, when executed by a processor, causes the processor to perform the method as defined in claim 1.

10. The non-transitory computer-readable storage medium according to claim 9, wherein the method further comprises:

receiving a second help-retrieving request from the server, wherein the second help-retrieving request indicates that a second control terminal requests to help retrieve a disconnected second mobile terminal;

displaying a request help interface, wherein the request help interface is configured to determine whether the first control terminal agrees to help retrieve the second mobile terminal;

sending, in response to a confirmation help instruction, a second confirmation help message to the server, wherein the second confirmation help message indicates that the first control terminal agrees to help retrieve the second mobile terminal; and controlling the second mobile terminal to move to a current position of the second control terminal.

11. The non-transitory computer-readable storage medium according to claim 9, wherein the first control terminal interacts with the first mobile terminal by means of radio communication, and the method further comprises:

sending a control signal to the first mobile terminal via a first channel to control the first mobile terminal, wherein the first channel is a communication channel between the first mobile terminal and the first control terminal;

receiving image-transmitting data from the first mobile terminal via the first channel, wherein the image-transmitting data comprises video data and sensor data, the video data being data acquired by a first person main view FPV camera on the first mobile terminal, and the sensor data being data acquired by a sensor on the first mobile terminal; and displaying the video data and the sensor data.

12. The non-transitory computer-readable storage medium according to claim 11, wherein prior to sending the control signal to the first mobile terminal via the first channel, the method further comprises:

receiving a pairing message broadcast by the first mobile terminal, wherein the pairing message comprises an identity identifier of the first mobile terminal and channel information of the first channel;

displaying a pairing interface, wherein the pairing interface comprises the identity identifier of the first mobile terminal and the channel information of the first channel;

sending, in response to a pairing instruction, a pairing request to the first mobile terminal, wherein the pairing request comprises an identity identifier of the first control terminal, a control mode expected by the first control terminal, the channel information of the first channel, and the identity identifier of the first mobile terminal; and receiving a pairing success response from the first mobile terminal, wherein the pairing success response indicates that the first mobile terminal has authorized the first control terminal to use the control mode for control.

13. The method according to claim 1, wherein the first control terminal interacts with the first mobile terminal by means of radio communication, and the method further comprises:

sending a control signal to the first mobile terminal via a first channel to control the first mobile terminal, wherein the first channel is a communication channel between the first mobile terminal and the first control terminal;

receiving image-transmitting data from the first mobile terminal via the first channel, wherein the image-transmitting data comprises video data and sensor data, the video data being data acquired by a first person main view FPV camera on the first mobile terminal, and the sensor data being data acquired by a sensor on the first mobile terminal; and displaying the video data and the sensor data.

14. The method according to claim 13, wherein prior to sending the control signal to the first mobile terminal via the first channel, the method further comprises:

receiving a pairing message broadcast by the first mobile terminal, wherein the pairing message comprises an identity identifier of the first mobile terminal and channel information of the first channel;

displaying a pairing interface, wherein the pairing interface comprises the identity identifier of the first mobile terminal and the channel information of the first channel;

sending, in response to a pairing instruction, a pairing request to the first mobile terminal, wherein the pairing request comprises an identity identifier of the first control terminal, a control mode expected by the first control terminal, the channel information of the first channel, and the identity identifier of the first mobile terminal; and receiving a pairing success response from the first mobile terminal, wherein the pairing success response indicates that the first mobile terminal has authorized the first control terminal to use the control mode for control.

15. A method for retrieving a lost-of-contact mobile terminal, applied to a server, comprising:

receiving a first lost-of-contact distress signal from a first mobile terminal, wherein the first lost-of-contact distress signal indicates that the first mobile terminal is disconnected from a first control terminal, and the first lost-of-contact distress signal at least comprises an identity identifier of the first mobile terminal, an identity identifier of the first control terminal, and current positioning information of the first mobile terminal;

broadcasting a first help-retrieving request based on the first lost-of-contact distress signal, wherein the first help-retrieving request is configured to request other control terminals to help retrieve the first mobile terminal, wherein the first help-retrieving request at least comprises first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal;

receiving a first confirmation help message from a second control terminal, wherein the first confirmation help message indicates that the second control terminal agrees to help retrieve the first mobile terminal; and sending the first confirmation help message to the first control terminal.

16. The method according to claim 15, wherein broadcasting the first help-retrieving request based on the first lost-of-contact distress signal comprises:

broadcasting the first lost-of-contact distress signal, or sending the first lost-of-contact distress signal to the first control terminal, wherein the first lost-of-contact distress signal is configured to determine whether the first control terminal chooses to retrieve the first mobile terminal by itself or request other control terminals to help retrieve the first mobile terminal;

receiving and broadcasting the first help-retrieving request from the first control terminal.

17. The method according to claim 16, wherein the first lost-of-contact distress signal at least comprises an identity identifier of the first mobile terminal, an identity identifier of the first control terminal, and current positioning information of the first mobile terminal; and the first help-retrieving request at least comprises first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

18. The method according to claim 15, wherein the first lost-of-contact distress signal at least comprises an identity identifier of the first mobile terminal, an identity identifier of the first control terminal, and current positioning information of the first mobile terminal; and the first help-retrieving request at least comprises first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal.

19. A system for retrieving a lost-of-contact mobile terminal, comprising a first mobile terminal, a first control terminal, and a server, wherein the first mobile terminal sends a first lost-of-contact distress signal to the server, wherein the first lost-of-contact distress signal indicates that the first mobile terminal is disconnected from the first control terminal, and the first lost-of-contact distress signal at least comprises an identity identifier of the first mobile terminal, an identity identifier of the first control terminal, and current positioning information of the first mobile terminal;

the server receives the first lost-of-contact distress signal, and sends the first lost-of-contact distress signal to the first control terminal;

the first control terminal receives the first lost-of-contact distress signal, and displays a help seeking interface, wherein the help seeking interface is configured to determine whether the first control terminal chooses to retrieve the first mobile terminal by itself or request other control terminals to help retrieve the first mobile terminal;

the first control terminal sends, in response to a help-retrieving instruction, a first help-retrieving request to the server, wherein the first help-retrieving request is configured to request other control terminals to help retrieve the first mobile terminal, wherein the first help-retrieving request at least comprises first authorization information, channel information of a first channel, and current positioning information of the first control terminal, wherein the first authorization information is information of the first mobile terminal authorizing the first control terminal to control the first mobile terminal, and the first channel is a communication channel between the first mobile terminal and the first control terminal;

the server receives and broadcasts the first help-retrieving request; and the server receives a first confirmation help message from a second control terminal, and sends the first confirmation help message to the first control terminal, wherein the first confirmation help message indicates that the second control terminal agrees to help retrieve the first mobile terminal.

20. The system according to claim 19, wherein the first control terminal interacts with the first mobile terminal by means of radio communication;

the first control terminal sends a control signal to the first mobile terminal via a first channel, wherein the first channel is a communication channel between the first mobile terminal and the first control terminal;

the first mobile terminal receives the control signal via the first channel, and executes a corresponding action according to the control signal;

the first mobile terminal sends image-transmitting data to the first control terminal via the first channel, wherein the image-transmitting data comprises video data and sensor data, the video data being data acquired by a first person main view FPV camera on the first mobile terminal, and the sensor data being data acquired by a sensor on the first mobile terminal; and the first control terminal receives the image-transmitting data via the first channel, and displays the video data and the sensor data.

* * * * *